United States Patent
Oveis Gharan et al.

(10) Patent No.: US 11,277,206 B1
(45) Date of Patent: Mar. 15, 2022

(54) MODULATION FORMATS WITH FRACTIONAL SPECTRAL EFFICIENCY

(71) Applicants: Shahab Oveis Gharan, Ottawa (CA); Michael Andrew Reimer, Stittsville (CA); James St. Leger Harley, Richmond (CA)

(72) Inventors: Shahab Oveis Gharan, Ottawa (CA); Michael Andrew Reimer, Stittsville (CA); James St. Leger Harley, Richmond (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/018,495

(22) Filed: Sep. 11, 2020

(51) Int. Cl.
| | |
|---|---|
| *H04B 10/00* | (2013.01) |
| *H04B 10/61* | (2013.01) |
| *H04B 10/516* | (2013.01) |
| *H04L 27/36* | (2006.01) |
| *H04L 27/34* | (2006.01) |
| *H04B 10/532* | (2013.01) |

(52) U.S. Cl.
CPC ..... *H04B 10/6162* (2013.01); *H04B 10/5161* (2013.01); *H04B 10/532* (2013.01); *H04L 27/3405* (2013.01); *H04L 27/367* (2013.01)

(58) Field of Classification Search
CPC ............ H04B 10/6162; H04B 10/5161; H04B 10/532; H04L 27/3405; H04L 27/367
See application file for complete search history.

(56) References Cited

U.S. PATENT DOCUMENTS

| | | |
|---|---|---|
| 9,071,362 B1 | 6/2015 | Taherzadehboroujeni et al. |
| 9,143,238 B2 | 9/2015 | Roberts et al. |
| 9,749,058 B2 | 8/2017 | Reimer et al. |
| 9,768,875 B2 | 9/2017 | Zhuge et al. |
| 10,735,135 B2 | 8/2020 | Oveis Gharan et al. |

(Continued)

OTHER PUBLICATIONS

Keisuke Kojima, "Nonlinearity-tolerant time domain hybrid modulation for 4-8 bits/symbol based on 2A8PSK", Mar. 19, 2017, Optical Fiber Communication Conference, All pages (Year: 2017).*

(Continued)

*Primary Examiner* — David G Payne
*Assistant Examiner* — Pranesh K Barua
(74) *Attorney, Agent, or Firm* — Integral Intellectual Property Inc.; Amy Scouten; Miriam Paton

(57) ABSTRACT

A transmitter maps an N-bit sequence to a point selected from a four-dimensional (4D) constellation consisting of $2^N$ points which form a subset of a Cartesian product of first and second two-dimensional (2D) constellations, the first constellation consisting of M1 points divided into first, second, and third points, and the second constellation consisting of M2 points divided into fourth, fifth, and sixth points, wherein M1, M2≥5, and wherein $\log_2(M1 \times M2) > N$. The subset includes any 4D point that is generated by combining any one of the M1 points and any one of the fourth points; includes any 4D point that is generated by combining any one of the first points and any one of M2 points; and excludes any 4D point that is generated by combining any third point and any sixth point. An optical signal representing the selected point is transmitted to a receiver.

20 Claims, 11 Drawing Sheets

(56) References Cited

U.S. PATENT DOCUMENTS

| | | | | |
|---|---|---|---|---|
| 2012/0263454 | A1* | 10/2012 | Koike-Akino | H04B 10/532 |
| | | | | 398/25 |
| 2015/0195045 | A1* | 7/2015 | Zhuge | H04B 10/532 |
| | | | | 398/184 |
| 2016/0373190 | A1* | 12/2016 | Reimer | H04B 10/5561 |
| 2019/0075002 | A1* | 3/2019 | Loghin | H04L 27/0008 |
| 2021/0091858 | A1* | 3/2021 | Bonetti | H04J 14/06 |

OTHER PUBLICATIONS

Agrell, et al., "Power-Efficient Modulation Formats in Coherent Transmission Systems", Journal of Lightwave Technology, vol. 27, No. 22, Nov. 15, 2009.

Sjodin, et al., "Comparison of 128-SP-QAM with PM-16-QAM", Optics Express, vol. 20, No. 8, Mar. 26, 2012.

Winzer, "High-spectral -efficiency optical modulation formats", IEEE, 2011, pp. 1-12, 2011.

Zhuge, et al., "Time domain hybrid QAM based rate-adaptive optical transmissions using high speed DACs", 2013 Optical Fiber Communication Conference and Exposition and the National Fiber Optic Engineers Conference (OFC/NFOEC), IEEE, 2013.

International Search Report and Written Opinion for PCT/IB2021/058066 dated Dec. 6, 2021.

Keisuke et al., "Nonlinearity-tolerant time domain hybrid modulation for 4-8 bits/symbol based on 2A8PSK", 2017 Optical Fiber Communications Conference and Exhibition.

Sjodin et al., "Comparison of 128-SP-QAM with PM-16-QAM", Optics Express, vol. 20, No. 8, Apr. 9, 2012.

\* cited by examiner

MODULATION FORMATS WITH FRACTIONAL SPECTRAL EFFICIENCY

TECHNICAL FIELD

This document relates to the technical field of communications.

BACKGROUND

In a communication network, a transmitter may transmit a signal over a communication channel to a receiver, where the signal is representative of digital information in the form of symbols or bits. The receiver may process the signal received over the communication channel to recover estimates of the symbols or bits. Various components of the communication network may contribute to signal degradation, such that the signal received at the receiver comprises a degraded version of the signal that was generated at the transmitter. In the case of an optical signal, degradation or distortion may be caused by polarization mode dispersion (PMD), polarization dependent loss or gain (PDL or PDG), state of polarization (SOP) rotation, amplified spontaneous emission (ASE), wavelength-dependent dispersion or chromatic dispersion (CD), and other effects. The degree of signal degradation may be characterized by a signal-to-noise ratio (SNR), or alternatively by a noise-to-signal ratio (NSR).

SUMMARY

According to a broad aspect, a transmitter device comprises circuitry configured to receive an N-bit sequence to be conveyed from the transmitter device to a receiver device over a communication channel. The transmitter device further comprises circuitry configured to map the N-bit sequence to a point selected from a four-dimensional (4D) constellation consisting of $2^N$ 4D points which form a subset of a set of 4D points generated from a Cartesian product of a first two-dimensional (2D) constellation and a second 2D constellation, the first 2D constellation consisting of M1 2D points divided or categorized or partitioned into first 2D points, second 2D points, and third 2D points, and the second 2D constellation consisting of M2 2D points divided or categorized or partitioned into fourth 2D points, fifth 2D points, and sixth 2D points, where M1≥5, where M2≥5, and where $\log_2(M1 \times M2) > N$. The subset includes any 4D point of the set that is generated by combining any one of the M1 2D points and any one of the fourth 2D points. The subset further includes any 4D point of the set that is generated by combining any one of the first 2D points and any one of M2 2D points. The subset excludes any 4D point of the set that is generated by combining any one of the third 2D points and any one of the sixth 2D points. The transmitter device further comprises circuitry configured to transmit over the communication channel an optical signal representing the selected point.

According to some examples, the subset consists of the $2^N$ 4D points of lowest energy in the set.

According to some examples, $\log_2(M1)$ is a positive integer and $\log_2(M2)$ is a positive integer.

According to some examples, M1=M2.

According to some examples, the first 2D constellation is identical to the second 2D constellation.

According to some examples, the first 2D constellation comprises a rectangular quadrature amplitude modulation (QAM) format and the second 2D constellation comprises another rectangular QAM format.

According to some examples, the QAM formats comprise any one or more of 8QAM, 9QAM, 16QAM, 32QAM, 36QAM, 64QAM, 128QAM, and 256QAM.

According to some examples, N=9, M1=32, and M2=32.

According to some examples, N=7, M1=16, and M2=16.

According to some examples, the 4D constellation is symmetric over each dimension.

According to some examples, each one of the $2^N$ 4D points represents four projections corresponding to four respective dimensions, and each projection comprises a respective magnitude and a respective sign, and the transmitter further comprises circuitry configured to uniquely determine the four signs of the selected point using four bits of the N-bit sequence, and to uniquely determine the four magnitudes of the selected point using the remaining n−4 bits of the N-bit sequence.

According to some examples, the optical signal comprises a dual-polarization optical signal, and each one of the $2^N$ 4D points represents four projections corresponding to four respective dimensions consisting of an in-phase dimension for each polarization and a quadrature dimension for each polarization.

According to some examples, the $2^N$ 4D points are distributed over a rectangular lattice.

According to some examples, the subset further includes one or more of the 4D points of the set that are generated by combining any one of the second 2D points with any one of the fifth 2D points.

According to some examples, the subset further excludes one or more of the 4D points of the set that are generated by combining any one of the second 2D points with any one of the sixth 2D points, and the subset further excludes one or more the 4D points of the set that are generated by combining any one of the third 2D points with any one of the fifth 2D points.

According to another broad aspect, a receiver comprises circuitry configured to detect four projections in four respective dimensions of an optical signal received over a communication channel, the four projections representing an estimate of a point selected from a four-dimensional (4D) constellation consisting of 512 points, where the 512 points form a subset of a set of points generated from a Cartesian product of two 32-quadrature amplitude modulation (32QAM) constellations, and the four projections comprising four respective magnitudes and four respective signs. The receiver further comprises circuitry configured to decode nine bit estimates from the four projections, the nine bit estimates comprising four sign-bit estimates and five magnitude-bit estimates. The decoding comprises calculating the four sign-bit estimates from the four projections, respectively. The decoding further comprises calculating a particular one of the five magnitude-bit estimates using the highest one of the four magnitudes and the two lowest of the four magnitudes. The decoding further comprises, based on the particular magnitude-bit estimate, selecting either a first set of functions or a second set of functions, the second set differing from the first set. The decoding further comprises calculating the remaining four magnitude-bit estimates by applying the selected set of functions to the four projections.

According to some examples, the subset consists of 256 points representing four magnitudes, each magnitude selected from a first value and a second value, the second value being greater than the first value; 64 points representing four magnitudes consisting of three instances of the first value and one instance of a third value, the third value being greater than the second value; and 192 points representing four magnitudes consisting of two instances of the first value, one instance of the second value, and one instance of the third value.

According to some examples, the particular magnitude-bit estimate represents whether or not the selected point belongs to the 256 points.

According to some examples, each sign-bit estimate and each magnitude-bit estimate comprises a respective confidence.

According to some examples, the decoding further comprises applying the other one of the first set of functions and the second set of functions to the four projections to calculate four alternative magnitude-bit estimates corresponding to the remaining magnitude-bit estimates, and responsive to determining that (i) any one of the four alternative magnitude-bit estimates comprises a different sign than a corresponding remaining magnitude-bit estimate, and (ii) the confidence in the particular magnitude-bit estimate is lower than the confidence in the corresponding remaining magnitude-bit estimate, reducing the confidence in the corresponding remaining magnitude-bit estimate.

DETAILED DESCRIPTION

Figure 1:
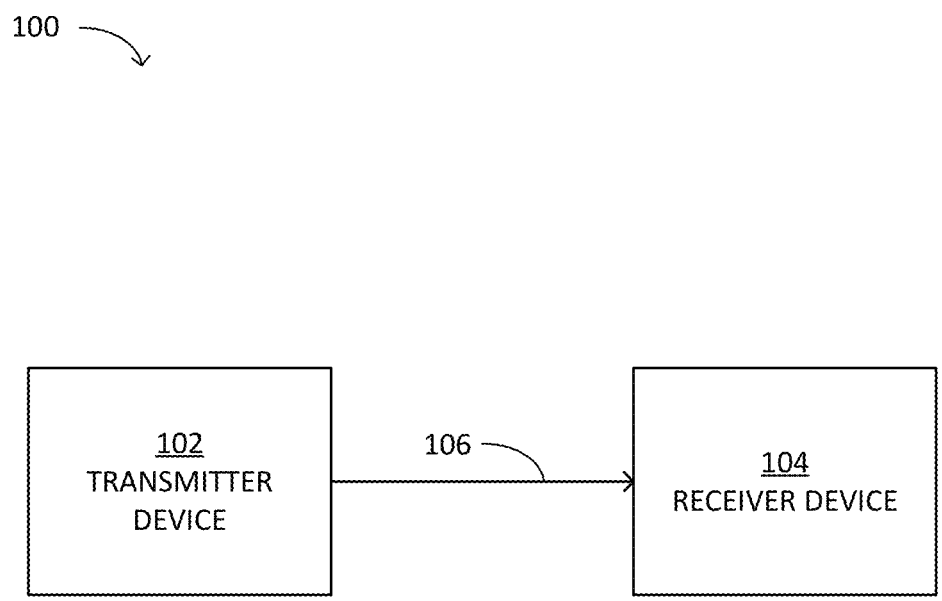
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may comprise additional elements not illustrated in FIG. 1. For example, the communication network 100 may comprise one or more additional transmitter devices, one or more additional receiver devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem. According to another example, the second optical transceiver may rely on non-coherent detection, such that it detects signal power rather than amplitude and phase values.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

Various elements and effects in the communication network 100 may result in the degradation of signals transmitted between different devices. Thus, a signal received at the receiver device 104 may comprise a degraded version of a signal transmitted by the transmitter device 102, where the degradation is caused by various impairments in the communication channel 106. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), nonlinear noise from propagation through fiber, and other effects. The degree of signal degradation may be characterized by a signal-to-noise ratio (SNR), or alternatively by a noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

The receiver device 104 may receive a communication signal transmitted over a communication channel from the transmitter device 102, where the communication signal conveys symbols that are representative of digital information. At the receiver device 104, the decoded symbols that are recovered may comprise noisy versions of the symbols that were originally transmitted by the transmitter device 102.

Figure 2:
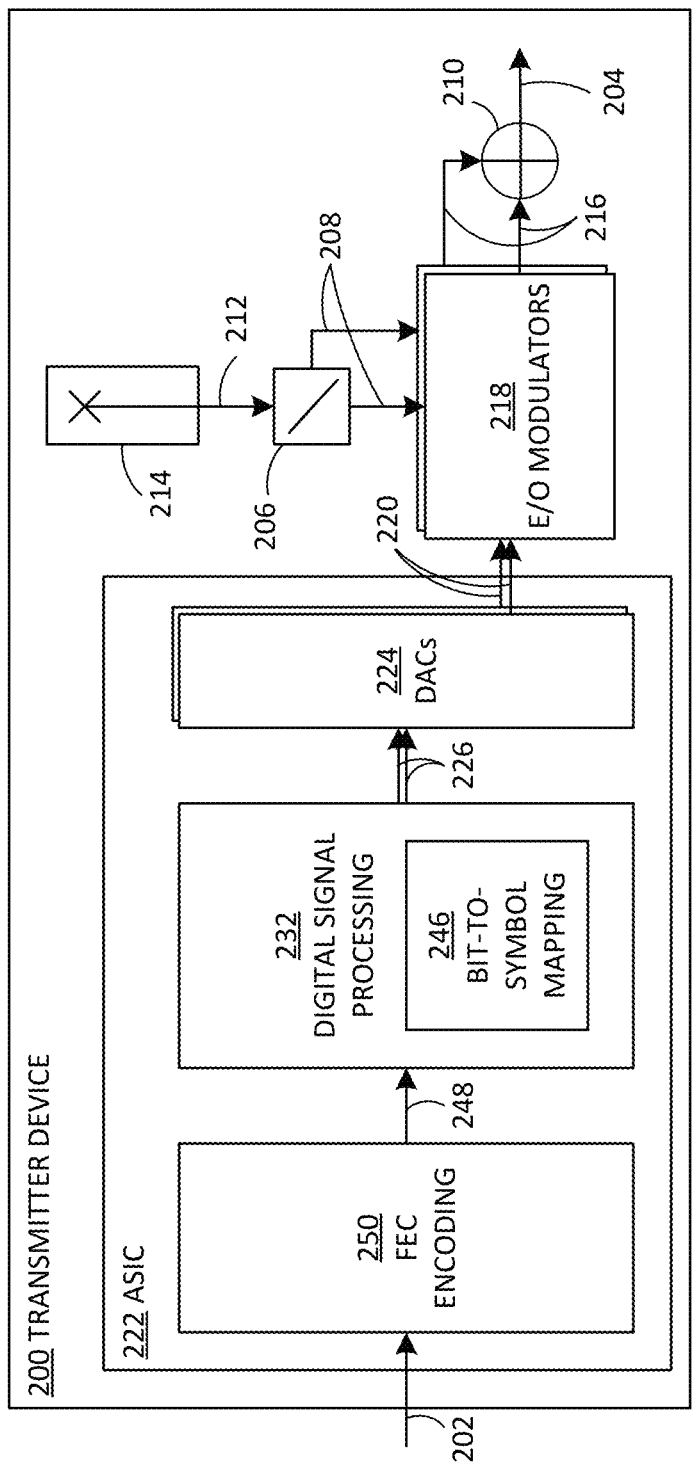
FIG. 2 illustrates an example transmitter device in accordance with some examples of the technology disclosed herein.

FIG. 2 illustrates an example transmitter device 200, in accordance with some examples of the technology disclosed herein. The transmitter device 200 is an example of the transmitter device 102. The transmitter device 200 may comprise additional components that are not described in this document.

The transmitter device 200 is configured to transmit an optical signal 204 which is representative of information bits (also referred to as client bits) 202. According to some examples, the transmitter device 200 employs polarization-division multiplexing (PDM). In other examples, generation of the optical signal 204 may involve one or more alternative techniques, such as single polarization modulation, modulation of an unpolarized carrier, mode-division multiplexing, spatial-division multiplexing, Stokes-space modulation, polarization balanced modulation, and the like. A laser 214 is configured to generate a continuous wave (CW) optical carrier 212. A polarizing beam splitter 206 is configured to split the CW optical carrier 212 into polarized components 208 that are modulated by electrical-to-optical (E/O) modulators 218 to produce modulated polarized optical signals 216 that are combined by a beam combiner 210, thus yielding the optical signal 204. In some examples (not shown), the polarizing beam splitter 206 and the beam combiner 210 may be replaced with simple power splitters and combiners. Together, elements such as the E/O modulators 218, the laser 214, the beam splitter 206, and the beam combiner 210 may form a communication interface configured to transmit optical signals to other devices in a communication network, such as the network 100.

The transmitter device 200 may comprise an application specific integrated circuit (ASIC) 222. The ASIC 222 may be configured to apply forward error correction (FEC) encoding 250 to the client bits 202 to generate FEC-encoded bits 248.

The ASIC 222 may be further configured to apply digital signal processing 232 to the FEC-encoded bits 248. As part of the processing 232, the FEC-encoded bits 248 may be mapped to one or more streams of data symbols according to a bit-to-symbol mapping 246. The processing 232 may further comprise digital up-sampling of the symbols, as well as operations that are subsequently applied to the sampled waveform, either in the time domain or the frequency domain. Such operations may include pulse shaping, frequency division multiplexing (FDM), distortion pre-compensation, and CD pre-compensation. The processing 232 may include the application of one or more filters, which may involve the application of one or more Fast Fourier Transforms (FFTs) and one or more corresponding inverse FFTs (IFFTs).

The processing 232 may output digital drive signals 226, which comprise electrical representations of the optical spectrum that are to be used in the transmission of the optical signal 204.

The transmitter device 200 comprises a plurality of digital-to-analog converters (DACs) 224 which may be used to convert the digital drive signals 226 into respective analog drive signals 220. Although illustrated as comprised in the ASIC 222, in an alternate implementation the DACs 224 or portions thereof may be separate from the ASIC 222. The DACs 224 may be controlled by a signal received from a voltage-controlled oscillator (VCO) (not shown). The analog drive signals 220 are used to drive the E/O modulators 218, which ultimately results in the optical signal 204.

Where the optical signal 204 is a dual-polarization (DP) signal, it may be characterized by an in-phase (I) amplitude in each polarization and a quadrature (Q) amplitude in each polarization. Thus, where the two polarizations are denoted by X and Y, the optical signal 204 may be defined by four amplitudes in four respective dimensions, where the I and Q dimensions of the X polarization are denoted XI and XQ, respectively, and where the I and Q dimensions of the Y polarization are denoted YI and YQ, respectively. Each amplitude comprises a magnitude and a sign. The amplitudes of a DP optical signal are established by the digital drive signals 226, which are determined based on the values of the FEC-encoded bits 248 and the bit-to-symbol mapping 246. The manner in which the FEC-encoded bits 248 are mapped to symbols, and the manner in which those symbols are to be represented by the amplitudes of the optical signal 204 are established by a modulation format selected for conveying information from the transmitter device 200 to a receiver device. Examples of modulation formats will be described further throughout this document.

Figure 3:
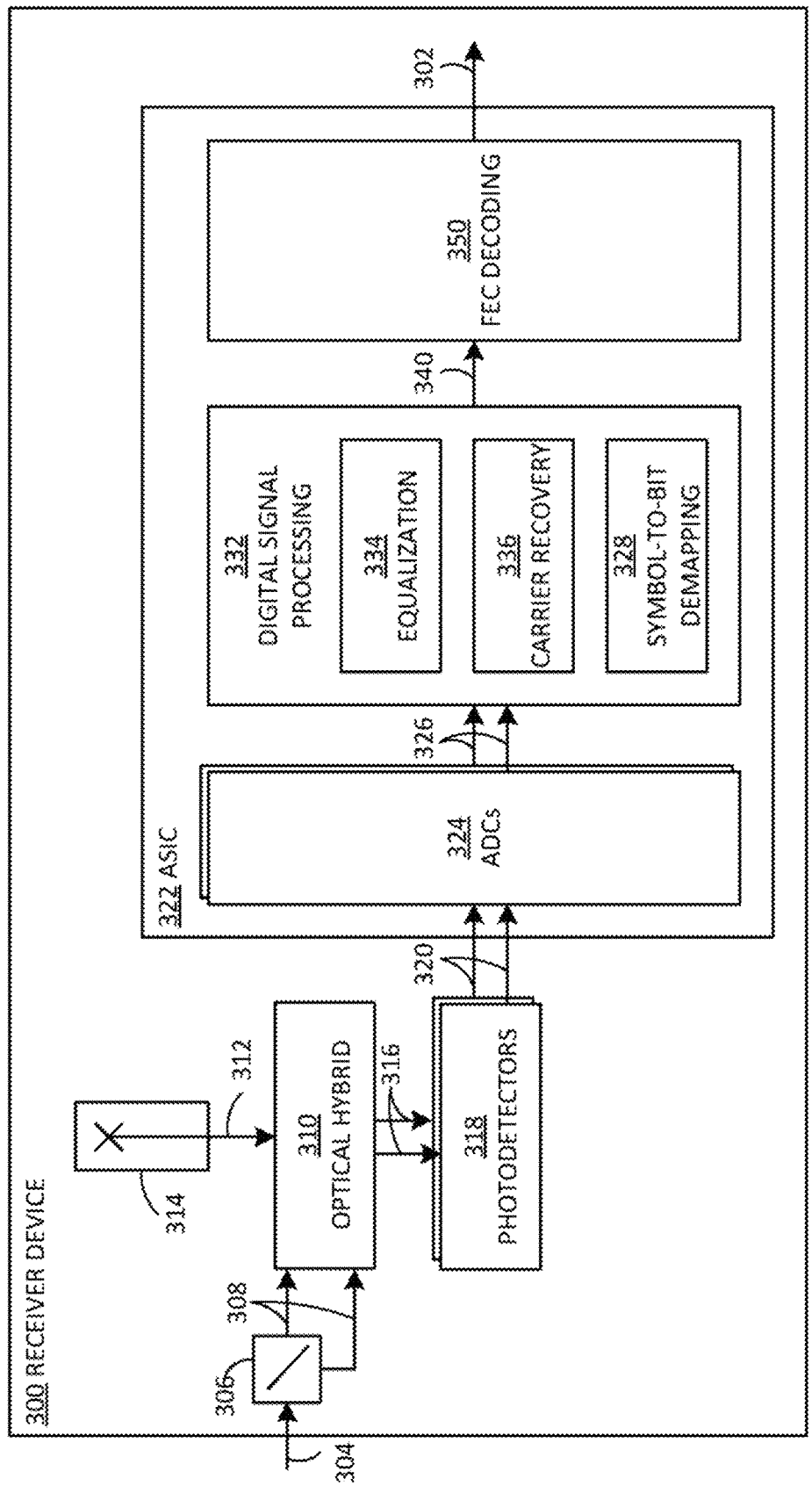
FIG. 3 illustrates an example receiver device in accordance with some examples of the technology disclosed herein.

FIG. 3 illustrates an example receiver device 300, in accordance with some examples of the technology disclosed herein. The receiver device 300 is an example of the receiver device 104. The receiver device 300 may comprise additional components that are not described in this document.

The receiver device 300 is configured to recover corrected client bits 302 from a received optical signal 304. The received optical signal 304 may comprise a degraded version of an optical signal generated by a transmitter device, such as the optical signal 204 generated by the transmitter device 200.

The receiver device 300 may comprise a polarizing beam splitter 306 configured to split the received optical signal 304 into polarized components 308. According to one example, the polarized components 308 may comprise orthogonally polarized components corresponding to an X polarization and a Y polarization. An optical hybrid 310 is configured to process the components 308 with respect to an optical signal 312 produced by a laser 314, thereby resulting in optical signals 316. Photodetectors 318 are configured to convert the optical signals 316 output by the optical hybrid 310 to analog signals 320. According to one example, the analog signals 320 may comprise four signals corresponding, respectively, to the I and Q components of the X polarization and the I and Q components of the Y polarization. Together, elements such as the beam splitter 306, the laser 314, the optical hybrid 310 and the photodetectors 318 may form a communication interface configured to receive optical signals from other devices in a communication network, such as the network 100.

The receiver device 300 may comprise an ASIC 322. The ASIC 322 may comprise analog-to-digital converters (ADCs) 324 which are configured to sample the analog signals 320, and to generate respective digital signals 326. Although illustrated as comprised in the ASIC 322, in an alternate implementation the ADCs 324 or portions thereof may be separate from the ASIC 322. The ADCs 324 sample the analog signals 320 periodically at a sample rate that is based on a signal received from a voltage-controlled oscillator (VCO) at the receiver device 300 (not shown).

The ASIC 322 is configured to apply digital signal processing 332 to the digital signals 326. The processing 332 may comprise equalization processing 334 which is designed to compensate for a variety of channel impairments, such as CD, SOP rotation, PMD including group delay (GD) and differential group delay (DGD), PDL or PDG, and other effects. The equalization processing 334 may comprise the application of one or more filters to the digital signals 320, either in the time domain or the frequency domain or both. The equalization processing 334 may involve the application of one or more FFTs and one or more corresponding IFFTs.

The digital signal processing 332 may comprise carrier recovery 336, thereby accounting for the difference between the frequency of the transmitter laser 214 and the frequency of the receiver laser 314.

The digital signal processing 332 may comprise symbol-to-bit demapping 328 using a decision circuit, thereby resulting in signals 340 which are representative of bit estimates. The received optical signal 304 may be representative of symbols comprising FEC-encoded bits generated as a result of applying FEC encoding to client bits. Accordingly, the signals 340 may further undergo FEC decoding 350 to recover the corrected client bits 302.

The symbol-to-bit demapping 328 used at the receiver device 300 depends on the modulation format that was used at the respective transmitter device, such as the transmitter device 200, to convey information.

There are numerous modulation formats that may be used to convey information via an optical signal, as described for example by Winzer in "High-Spectral-Efficiency Optical Modulation Formats" (*Journal of Lightwave technology*, Vol. 30, Issue 24, 2012) and by Agrell and Karlsson in "Power-Efficient Modulation Formats in Coherent Transmission Systems" (*Journal of Lightwave Technology*, Vol. 27, Issue 22, 2009). A given modulation format may be represented by a constellation consisting of a plurality of constellation points. Where the modulation format conveys bits using a single polarization, each constellation point may be defined by two dimensions, such as XI and XQ. Where the modulation format conveys bits using two polarizations, also referred to as a dual-polarization (DP) signal, each constellation point may be defined by four dimensions, such as XI, XQ, YI, and YQ. A modulation format may be spread over multiple polarizations and/or multiple dimensions (e.g., XI, XQ, YI, YQ). Alternatively or additionally, a modulation format may be spread over time and/or frequency.

The choice of modulation format may determine the spectral efficiency that is achievable (i.e., the number of bits per symbol interval or baud). For example, binary phase shift keying (BPSK) may achieve a spectral efficiency of 1 bit per baud per polarization (or 2 bits per baud over four dimensions), whereas quadrature phase shift keying (QPSK) or 4-level pulse-amplitude modulation (PAM) may achieve a spectral efficiency of 2 bits per baud per polarization (or 4 bits per baud over four dimensions). Quadrature amplitude modulation (QAM) may be used with different numbers of levels (e.g., 8, 16, 32, etc.) to achieve higher spectral efficiencies. For example, 16-level QAM (also referred to as 16QAM) has a higher spectral efficiency than 8-level QAM (also referred to as 8QAM). As the spectral efficiency increases, the required SNR of the optical signal 304 for error-free FEC decoding also increases.

Figure 4:
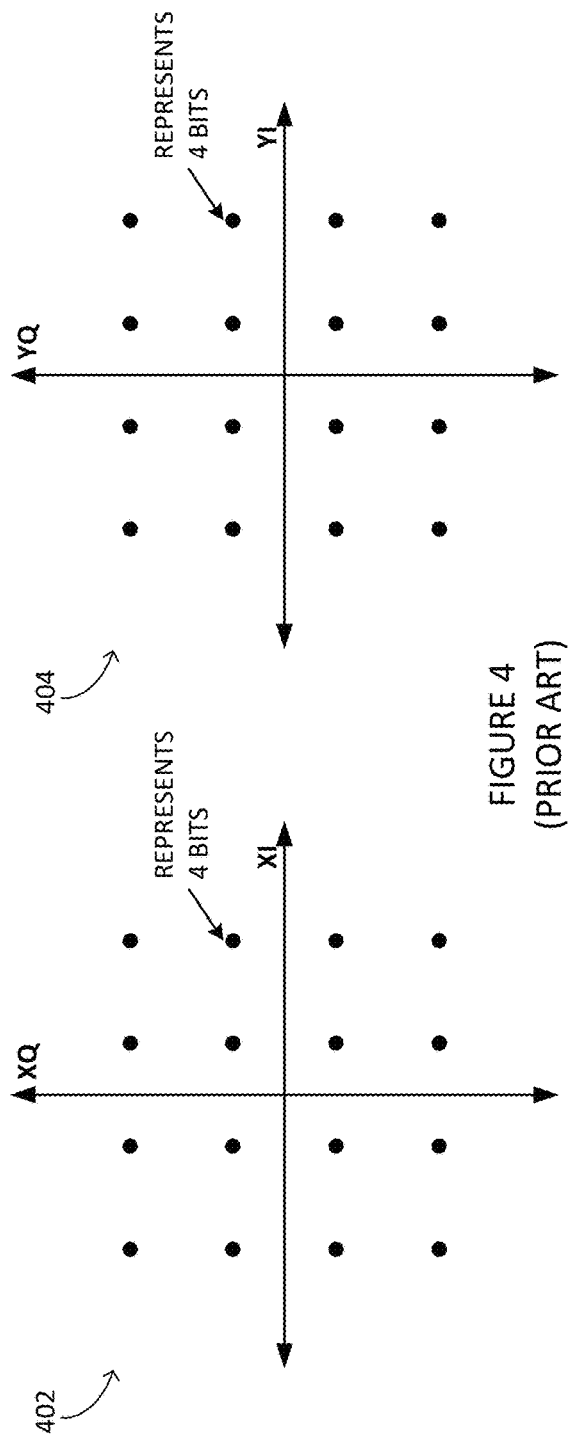
FIG. 4 illustrates a schematic showing a dual-polarization 16-level quadrature amplitude modulation (DP-16QAM) format in accordance with PRIOR ART.

FIG. 4 illustrates a DP-16QAM format in accordance with prior art. This modulation format conveys bits over two polarizations, X and Y, and may therefore be represented by a four-dimensional (4D) constellation. The dimensions XI and XQ are illustrated in plot 402, while the dimensions YI and YQ are illustrated in plot 404. There are 16 possible combinations of amplitudes in the dimensions XI and XQ, as well as 16 possible combinations of amplitudes in the dimensions YI and YQ. Accordingly, there are 16×16=256 possible combinations of amplitudes in all four dimensions XI, XQ, YI, and XQ. Thus, an optical signal modulated according to the DP-16QAM format illustrated in FIG. 4 may achieve a spectral efficiency of 8 bits per baud (because $256=2^8$), which is equivalent to four bits per baud per polarization. Each two-dimensional (2D) point in plot 402 is capable of representing four bits, while each 2D point in plot 404 is also capable of representing four bits. Therefore, a single 4D point of the DP-16QAM constellation is capable of representing eight bits. The DP-16QAM format illustrated in FIG. 4 is an example of a Cartesian product of two 16QAM constellations. In general, a Cartesian product of two 2D constellations C1 and C2 is a 4D constellation which consists of all pairs (c1, c2) for which c1$\in$C1 and c2$\in$C2.

Figure 5:
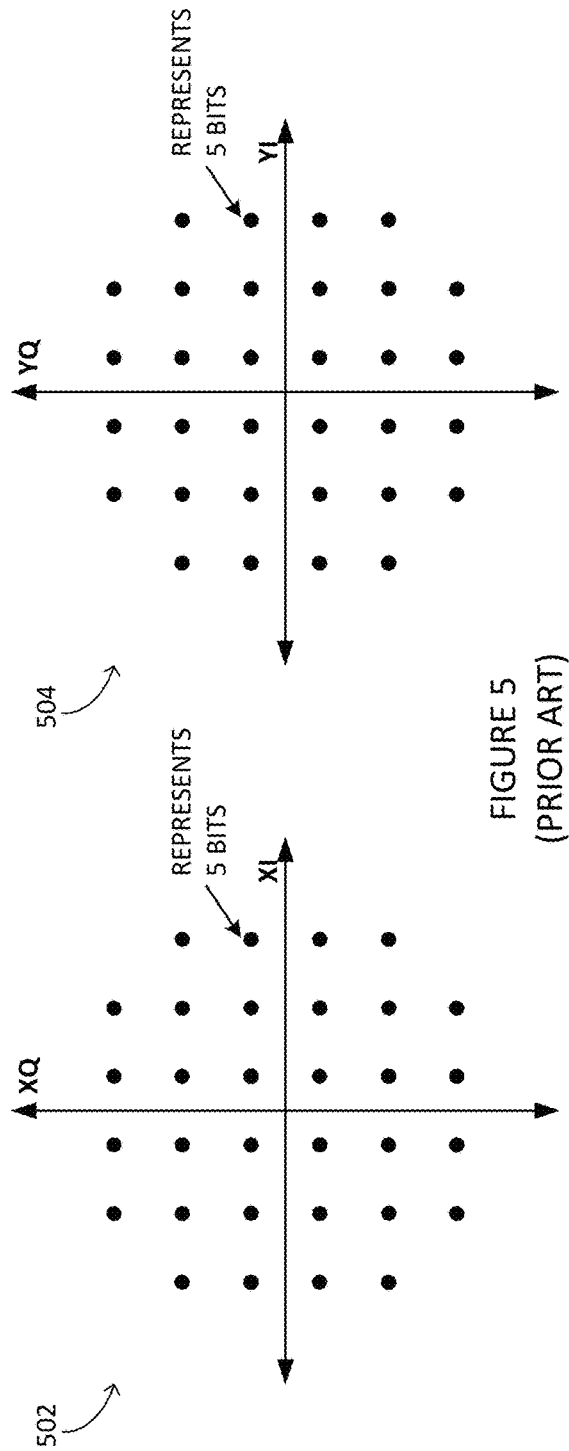
FIG. 5 illustrates a schematic showing a DP-32QAM format in accordance with PRIOR ART.

FIG. 5 illustrates a DP-32QAM format in accordance with prior art. Similarly to DP-16QAM, this modulation format may be represented by a 4D constellation, where the dimensions XI and XQ are illustrated in plot 502, and the dimensions YI and YQ are illustrated in plot 504. There are 32 possible combinations of amplitudes in the dimensions XI and XQ, as well as 32 possible combinations of amplitudes in the dimensions YI and YQ. Accordingly, there are 32×32=1024 possible combinations of amplitudes in all four dimensions XI, XQ, YI, and XQ. Thus, an optical signal modulated according to the DP-32QAM format illustrated in FIG. 5 may achieve a spectral efficiency of 10 bits per baud (because $1024=2^{10}$), which is equivalent to five bits per baud per polarization. Each 2D point in plot 502 is capable of representing five bits, while each 2D point in plot 504 is also capable of representing five bits. Therefore, a single 4D point of the DP-32QAM constellation is capable of representing 10 bits. The DP-32QAM format illustrated in FIG. 5 is an example of a Cartesian product of two 32QAM constellations.

Spectral efficiencies that cannot be reduced down to a whole number of bits per dimension may be referred to as fractional spectral efficiencies. For example, the spectral efficiency achieved using DP-32QAM is a fractional spectral efficiency because 5 bits per baud per polarization is equivalent to 2.5 bits per baud per dimension (which is not an integer number). In contrast, the spectral efficiency achieved using DP-16QAM is not a fractional spectral efficiency because 4 bits per baud per polarization is equivalent to 2 bits per baud per dimension (which is a whole number).

DP-32QAM is able to achieve a greater spectral efficiency than DP-16QAM because each one of its 4D constellation points represents more bits (10 bits per baud relative to 8 bits per baud). However, the higher throughput achievable with DP-32QAM is at the expense of greater sensitivity to noise during decoding. For example, the points in plots 502 and 504 are closer together than the points in plots 402 and 404, such that the required SNR for a FEC scheme to decode 32QAM error-free is greater than the required SNR for the same FEC scheme to decode 16QAM error-free. Similarly, it may be shown that the required SNR to decode 16QAM error-free is greater than the required SNR to decode 8QAM error-free, and so on.

Different applications may have different requirements for spectral efficiency and noise tolerance. In some cases, these requirements may not be satisfied by commonly-used modulation formats, such as 8QAM, 16QAM, and 32QAM. For example, a given application may require a spectral efficiency that is greater than 4 bits per baud per polarization (e.g., greater than the spectral efficiency achievable with DP-16QAM), but may be unable to meet the minimum SNR required for a spectral efficiency of 5 bits per baud per polarization (e.g., the required SNR for DP-32QAM). In this case, an intermediate spectral efficiency, such as 4.5 bits per baud per polarization, may provide the appropriate balance between throughput and noise sensitivity. A fractional spectral efficiency of 4.5 bits per baud per polarization is equivalent to 2.25 bits per baud per dimension. Increased flexibility in the balance between spectral efficiency and required SNR may be of particular interest at higher transmission rates, such as 800 GB/s, in which FEC performance is very sensitive to the underlying modulation format and spectral efficiency number.

Several known techniques may be used to achieve a fractional spectral efficiency that is intermediate between the respective spectral efficiencies achievable with different modulation formats. For example, for a given modulation format, probabilistic amplitude shaping, also referred to as probabilistic constellation shaping, may be used to increase the probability of selecting constellation points having lower amplitudes, while decreasing the probability of selecting constellation points having higher amplitudes. The result is a decrease in spectral efficiency. Techniques for probabilistic amplitude shaping may be complex to implement and are described, for example, by Oveis Gharan et al. in U.S. Pat. No. 10,735,135. Intermediate spectral efficiencies may also be achieved using hybrid modulation formats such as those described by Zhuge et al. in "Time domain hybrid QAM based rate-adaptive optical transmissions using high speed DACs," (2013 *Optical Fiber Communication Conference and Exposition and the National Fiber Optic Engineers Conference (OFC/NFOEC)*, IEEE, 2013). For example, a 32QAM format may be alternated with a 16QAM format over successive time intervals such that the average spectral efficiency is 4.5 bits per baud per polarization. In another example, intermediate spectral efficiencies may be achieved using set partitioning as described, for example, by Sjodin et al. in "Comparison of 128-SP-QAM with PM-16-QAM" (*Optics Express*, Vol. 20, Issue 8, 2012). Probabilistic amplitude shaping and set partitioning may be associated with a high degree of decoding complexity, while hybrid QAM schemes may suffer from performance loss.

In view of the complexities and/or limitations associated with known techniques such as probabilistic amplitude shaping, hybrid modulation formats, and set partitioning, new solutions for achieving flexibility in spectral efficiency may be of interest. Modulation formats with fractional spectral efficiencies in accordance with examples of the proposed technology will now be described.

Figure 6:
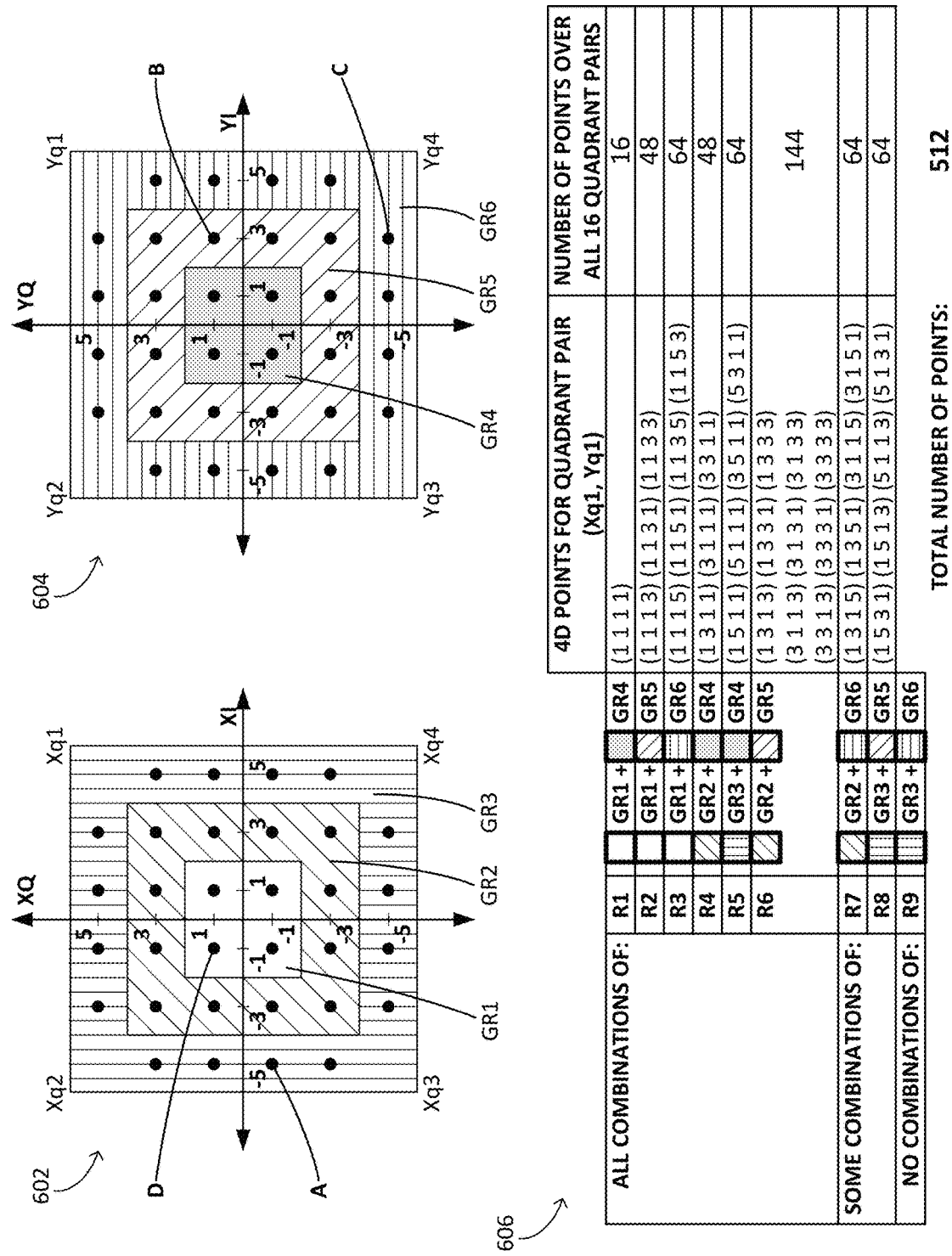
FIG. 6 illustrates a schematic showing a first example modulation format in accordance with some examples of the technology disclosed herein.

FIG. 6 illustrates a schematic showing a first example modulation format in accordance with some examples of the proposed technology. The first example modulation format conveys bits over two polarizations, X and Y, and may therefore be represented by a 4D constellation wherein each constellation point is defined by four amplitudes corresponding to dimensions XI, XQ, YI, and YQ, respectively. The dimensions XI and XQ are illustrated in plot 602, while the dimensions YI and YQ are illustrated in plot 604. Plot 602 comprises four quadrants denoted Xq1, Xq2, Xq3, and Xq4, respectively (i.e., the X quadrants). Plot 604 comprises four quadrants denoted Yq1, Yq2, Yq3, and Yq4, respectively (i.e., the Y quadrants). In this example, the 4D constellation is defined in the dimensions XI, XQ, YI, and YQ. However, in other examples, the four dimensions may be mapped to different axes, for example, in the time-domain and/or frequency-domain. For example, FDM techniques may be used to distribute one or more of the dimensions over frequency, rather than polarization. In general, the modulation format may be spread over any combination of time, frequency, and polarization.

The first example modulation format is designed to achieve a spectral efficiency of 9 bits per baud over four dimensions, which is equivalent to 4.5 bits per baud per polarization, or 2.25 bits per baud per dimension. The number of 4D constellation points required to achieve this spectral efficiency is $2^9$=512. These 512 constellation points form a subset of points selected from a set of 1024 points generated from a Cartesian product of two 32QAM constellations (in this case, DP-32QAM), where the subset is defined according to a set of rules, such as the rules provided in table 606. The rules dictate which combinations of magnitudes in the XI, XQ, YI, and YQ dimensions are permitted. In this example, the rules dictate that points forming the subset are the 512 points of the 1024-point set having the lowest energies.

In the example of FIG. 6, there are six possible amplitudes in each dimension, herein referred to as projections, namely (−5, −3, −1, 1, 3, 5). The projections include three possible magnitudes (1, 3, 5) and two possible signs (+, −). The rules for determining which 4D points of the 1024-point set are selected to form the 512-point subset may be expressed by dividing the points of each 2D constellation into groups. For example, as illustrated in FIG. 6, the 2D points of the constellation in plot 602 are divided or categorized or partitioned into first points (belonging to group GR1), second points (belonging to group GR2), and third points (belonging to group GR3), while the 2D points of the constellation in plot 604 are divided or categorized or partitioned into fourth points (belonging to group GR4), fifth points (belonging to group GR5), and sixth points (belonging to group GR6). In this example, each one of groups GR1 and GR4 consists of the 2D points for which each projection has a magnitude of 1. Each one of groups GR2 and GR5 consists of the 2D points for which one or both projections has a magnitude of 3. Each one of groups GR3 and GR6 consists of the 2D points for which one or both projections has a magnitude of 5. The group definitions in FIG. 6 are merely examples, and other groupings are contemplated.

Rows R1, R2, and R3 of table 606 stipulate that the 512-point subset includes any 4D point that is generated by combining any point in group GR1 with any point in any one of groups GR4, GR5, and GR6 (i.e., any point in plot 604). Rows R4 and R5 of table 606 stipulate that the 512-point subset further includes any 4D point that is generated by combining any point in any one of groups GR2 and GR3 with any point in group GR4. Thus, referring to the quadrant pair (Xq1, Yq1) alone, rows R1-R5 of table 606 define 15 4D points that are included in the subset. Since there are 16 possible pairs of X quadrants and Y quadrants, this results in 15×16=240 unique 4D points being included in the subset as a result of these rules.

Row R6 of table 606 stipulates that the 512-point subset includes any 4D point that is generated by combining any point in group GR2 with any point in any point in group GR5. This corresponds to 9×16=144 additional 4D points that are included in the subset.

Rows R7 and R8 of table 606 stipulate that the 512-point subset includes some 4D points that are generated by combining points from group GR2 with points from group GR6, as well as some 4D points that are generated by combining points from group GR3 with points from group GR5. In this example, the specific combinations of points from group GR2 and points from group GR6 result in 4×16=64 additional 4D points being included in the subset. Similarly, the specific combinations of points from group GR3 and points from group GR5 also result in 4×16=64 additional 4D points being included in the subset.

Row R9 of table 606 stipulates that the 512-point subset excludes any 4D point that is generated by combining any point in group GR3 with any point in group GR6.

According to rows R1, R2, R4, and R6 in table 606, all combinations of magnitudes 1 and 3 are permitted. Thus, a corresponding rule may be defined wherein all of the DP-32QAM constellation points having dimensions with projections selected from (−3, −1, 1, 3) are permitted. Over all 16 quadrant pairs, there are 16×16=256 unique 4D points satisfying this rule.

Rows R3 and R5 stipulate that permitted combinations of magnitudes include those consisting of three instances of magnitude 1 and one instance of magnitude 5. Thus, a corresponding rule may be defined wherein all of the DP-32QAM points having three dimensions with a projection selected from (−1, 1) and one dimension with a projection selected from (−5, 5) are permitted. Over all 16 quadrant pairs, there are 16×4=64 unique 4D points satisfying this rule.

Rows R3, R5, R7, R8, and R9 stipulate that permitted combinations of magnitudes include those consisting of two instances of magnitude 1, one instance of magnitude 3, and one instance of magnitude 5. Thus, a corresponding rule may be defined wherein all of the DP-32QAM constellation points having two dimensions with a projection selected from (−1, 1), one dimension with a projection selected from (−3, 3), and one dimension with a projection selected from (−5, 5) are permitted. Over all 16 quadrant pairs, there are 16×12=192 unique 4D points satisfying this rule.

Using the rules for the permitted combinations of magnitudes, as expressed in table 606, a total of 512 4D points are selected from the 1024 points of the DP-32QAM format. The constellation formed by the selected 512-point subset is representative of a modulation format which may herein be referred to as 4D-512QAM, since the modulation format consists of 512 levels defined using QAM. The points of the DP-32QAM constellation that do not satisfy the rules are excluded from 4D-512QAM constellation.

In this example, the 256 points having the lowest energies (all combinations of magnitudes 1 and 3) are equivalent to the points of a DP-16QAM constellation. The remaining 256 points of the 4D-512QAM constellation are the next lowest-energy points, which include one instance of magnitude 5 and, at most, one instance of magnitude 3. For ease of explanation, the constellation points of the 4D-512QAM constellation that do not belong to the DP-16QAM constellation may be described as belonging to the complement of DP-16QAM. Notably, the signs of the projections on each dimension play no role on the selection of the 512 constellation points.

The rules of table 606 will now be applied to four example 4D points selected from the set of 1024 4D points generated from the Cartesian product of the two 2D constellations in FIG. 6 to determine whether the points are included in the 4D-512QAM constellation. A first example 4D point is (A, B)=(−5, −1, 3, 1). The 2D point A=(−5, −1) belongs to group GR3, while the 2D point B=(3, 1) belongs to group GR5. According to row R8, some combinations of groups GR3 and GR5 are permitted, while others are not. In this case, with one instance of magnitude 5, one instance of magnitude 3, and two instances of magnitude 1, the four dimensions of the point (A, B) satisfy one of the rules. Accordingly, the point (A, B) is included in the 512 points of the 4D-512QAM constellation. Specifically, the point (A, B) belongs to the DP-16QAM complement.

A second example 4D point is (A, C)=(−5, −1, 3, −5). The 2D point A=(−5, −1) belongs to group GR3, while the 2D point C=(3, −5) belongs to group GR6. According to row R9, any combination of a point from GR3 with a point from GR6 is excluded from the 4D-512QAM constellation. Accordingly, the point (A, C) is not included in the 512 points of the 4D-512QAM constellation.

A third example point is (D, B)=(−1, 1, 3, 1). The 2D point D=(−1, 1) belongs to group GR1, while the 2D point B=(3, 1) belongs to group GR5. According to row R2, all combinations of groups GR1 and GR5 are permitted. With three instances of magnitude 3 and one instance of magnitude 1, the four dimensions of the point (D, B) satisfy the rules. Accordingly, the point (D, B) is included in the 512 points of the 4D-512QAM constellation. Specifically, the point (D, B) is included in the DP-16QAM subset of DP-32QAM.

A fourth example point is (D, C)=(−1, 1, 3, −5). The 2D point D=(−1, 1) belongs to group GR1, while the 2D point C=(3, −5) belongs to group GR6. According to row R3, all combinations of groups GR1 and GR6 are permitted. With one instance of magnitude 5, one instance of magnitude 3, and two instances of magnitude 1, the four dimensions of the point (D, C) satisfy the rules. Accordingly, the point (D, C) is included in the 512 points of the 4D-512QAM constellation. Specifically, the point (D, C) belongs to the DP-16QAM complement.

Each 4D point of the 4D-512QAM constellation is representative of a unique sequence of nine bits. Four bits of the nine bits determine the four respective signs of the projections to which the nine bits are mapped. The remaining five bits determine the four magnitudes of the projections to which the nine bits are mapped. For example, according to one possible bit-to-symbol mapping, a bit sequence (b1, b2, b3, b4, b5, b6, b7, b8, b9)=(1, 1, 1, 0, 0, 1, 0, 0, 0) may be mapped to the 4D point (D, B), which is defined by the set of projections (−1, 1, 3, 1). The bits (b1, b2, b3, b4, b5)=(1, 1, 1, 0, 0) may determine the four magnitudes (1, 1, 3, 1) defining the 4D point (i.e., the position of the point within a quadrant pair), while the bits (b6, b7, b8, b9)=(1, 0, 0, 0) may determine the four respective signs (−, +, +, +) defining the 4D point (i.e., the quadrant pair).

According to the first example modulation format of FIG. 6, the 4D points are defined by projections on a 4D rectangular lattice such that there are only six possible values for each projection: ±1, ±3, ±5. In some of the designs, the bit resolution constraint on the transmitter ASIC and/or on the bit resolution limitation on the transmitter DACs may limit the number of possible projections on each dimension of the multi-dimensional modulation format. Hence, ensuring that the projections belong to a regular PAM signaling ±1, ±3, ±5 may reduce transmitter complexity and power. However, other examples are contemplated wherein the projections of the 4D points are not restricted to a rectangular lattice. For example, projections may be determined using an optimization procedure designed to achieve a lower BER.

Figure 7:
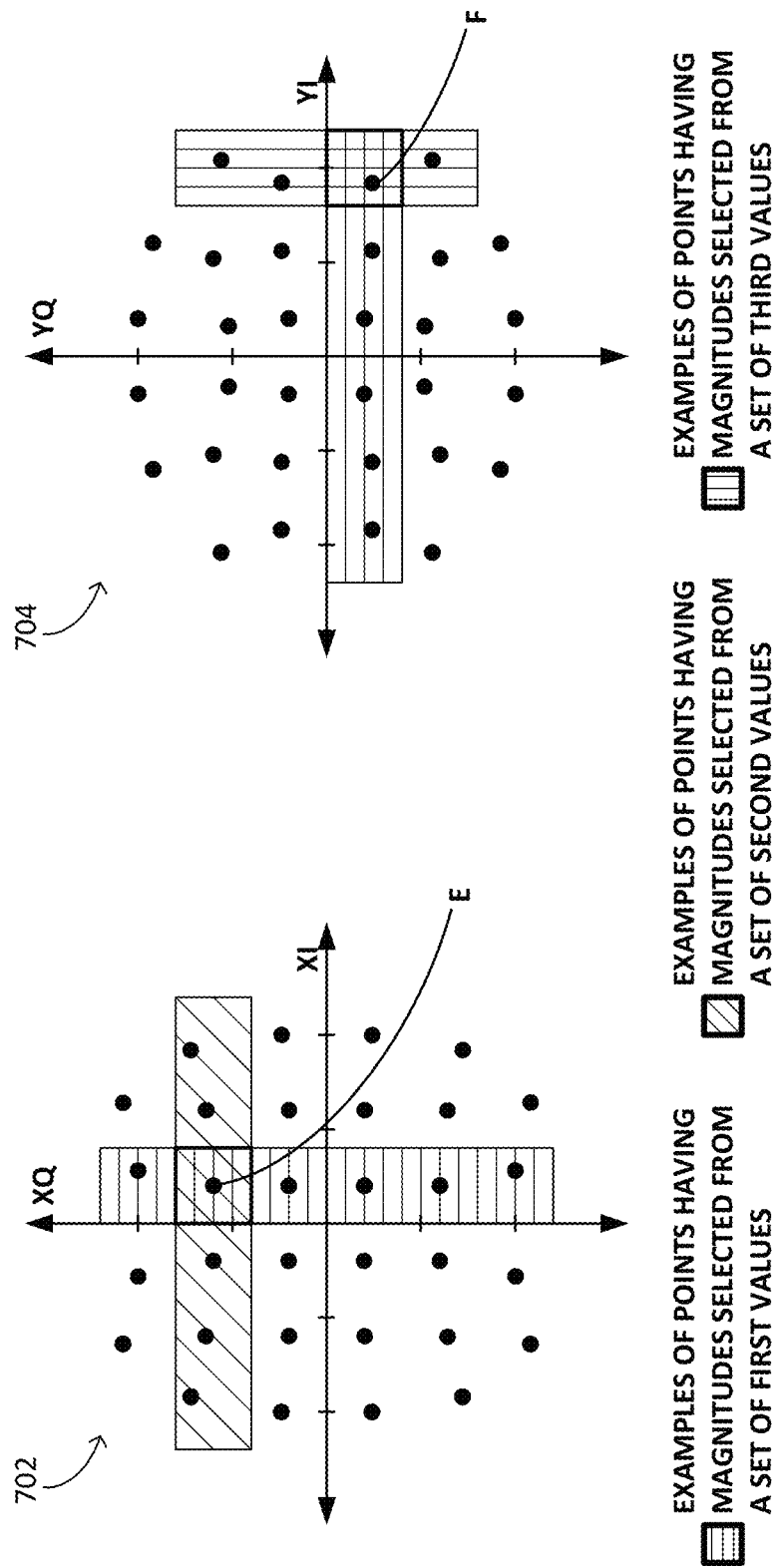
FIG. 7 illustrates a schematic showing a second example modulation format in accordance with some examples of the technology disclosed herein.

FIG. 7 illustrates a schematic showing a second example modulation format in accordance with some examples of the proposed technology. The dimensions XI and XQ are illustrated in plot 702, while the dimensions YI and YQ are illustrated in plot 704.

The second example modulation format is similar to the first modulation format described with respect to FIG. 6, except that the projections of the 4D points have been optimized for minimization of BER. Various optimization algorithms are contemplated, such as gradient descent optimization. As a result, instead of each 4D point being defined by four magnitudes selected from three possible values (e.g., 1, 3, and 5, as described with respect to FIG. 6), each 4D point is defined by four magnitudes selected from three possible sets of values. For example, the combinations of magnitudes may be selected from a set of first values, a set of second values, and a set of third values, wherein each second value is greater than each first value, and wherein each third value is greater than each second value. In the limit where a set of values has a variance of zero, all of the values within that set are identical. For example, the first example modulation format described with respect to FIG. 6 corresponds to the case where the first set of values includes magnitude 1, the second set of values includes magnitude 3, and the third set of values includes magnitude 5, and where the variance of each set of values is zero. In contrast, the points of the second example modulation format shown in FIG. 7 are defined by magnitudes selected from three sets of values with non-zero variance. For example, the horizontally-hatched region of plot 702 includes six 2D points having magnitudes in dimension XI that belong to a set of first values. As a result of optimization, the magnitudes are not identical, such that the variance of the set of first values is non-zero. The horizontally-hatched region in plot 704 also includes six 2D points having magnitudes in dimension YQ that belong to the set of first values. Again, these magnitudes are not identical as a result of optimization. The 12 points in the horizontally-hatched regions in plots 702 and 704 represent merely some examples of the points having magnitudes that belong to the set of first values.

The diagonally-hatched region in plot 702 includes six 2D points having magnitudes in dimension XQ that belong to a set of second values with a non-zero variance. These points are merely examples of the points having magnitudes that belong to the set of second values. The set of second values is distinguished from the set of first values in that each second value is greater than each first value.

The vertically-hatched region in plot 704 includes four 2D points having magnitudes in dimension YQ that belong to a set of third values with a non-zero variance. These points are merely examples of the points having magnitudes that belong to the set of third values. The set of third values is distinguished from the set of second values in that each third value is greater than each second value (and also each first value).

The constellation for the second example modulation format may be determined using similar rules to those described with respect to FIG. 6. However, the rules may be defined with reference to permitted combinations of magnitudes selected from a set of first values (rather than strictly magnitude "1"), a set of second values (rather than strictly magnitude "3"), and a set of third values (rather than strictly magnitude "5"). For example, FIG. 7 illustrates a 4D point (E, F)=(aXI, aXQ, aYI, aYQ), where aXI is the XI projection, where aXQ is the XQ projection, where aYI is the YI projection, and where aYQ is the YQ projection. The magnitude |aXI| has a value that is selected from the set of first values; the magnitude |aXQ| has a value that is selected from the set of second values; the magnitude |aYI| has a value that is selected from the set of third values; and the magnitude |aYQ| has a value that is selected from the set of first values. Thus, the 4D point (E, F) represents four magnitudes consisting of two values selected from the set of first values, one value selected from the set of second values, and one value selected from the set of third values. Referring to FIG. 6, the various combinations of groups that are permitted according to rows R3, R5, R7, and R8 of table 606 effectively dictate that the rectangular-lattice 4D-512QAM constellation includes any 4D point with two instances of magnitude 1, one instance of magnitude 3, and one instance of magnitude 5. Using analogous rules which refer to sets of magnitude values, the non-rectangular-lattice 4D-512QAM constellation of FIG. 7 includes any 4D point with magnitudes consisting of two values selected from the set of first values, one value selected from the set of second values, and one value selected from the set of third values. The 4D point (E, F) satisfies this requirement.

Figure 8:
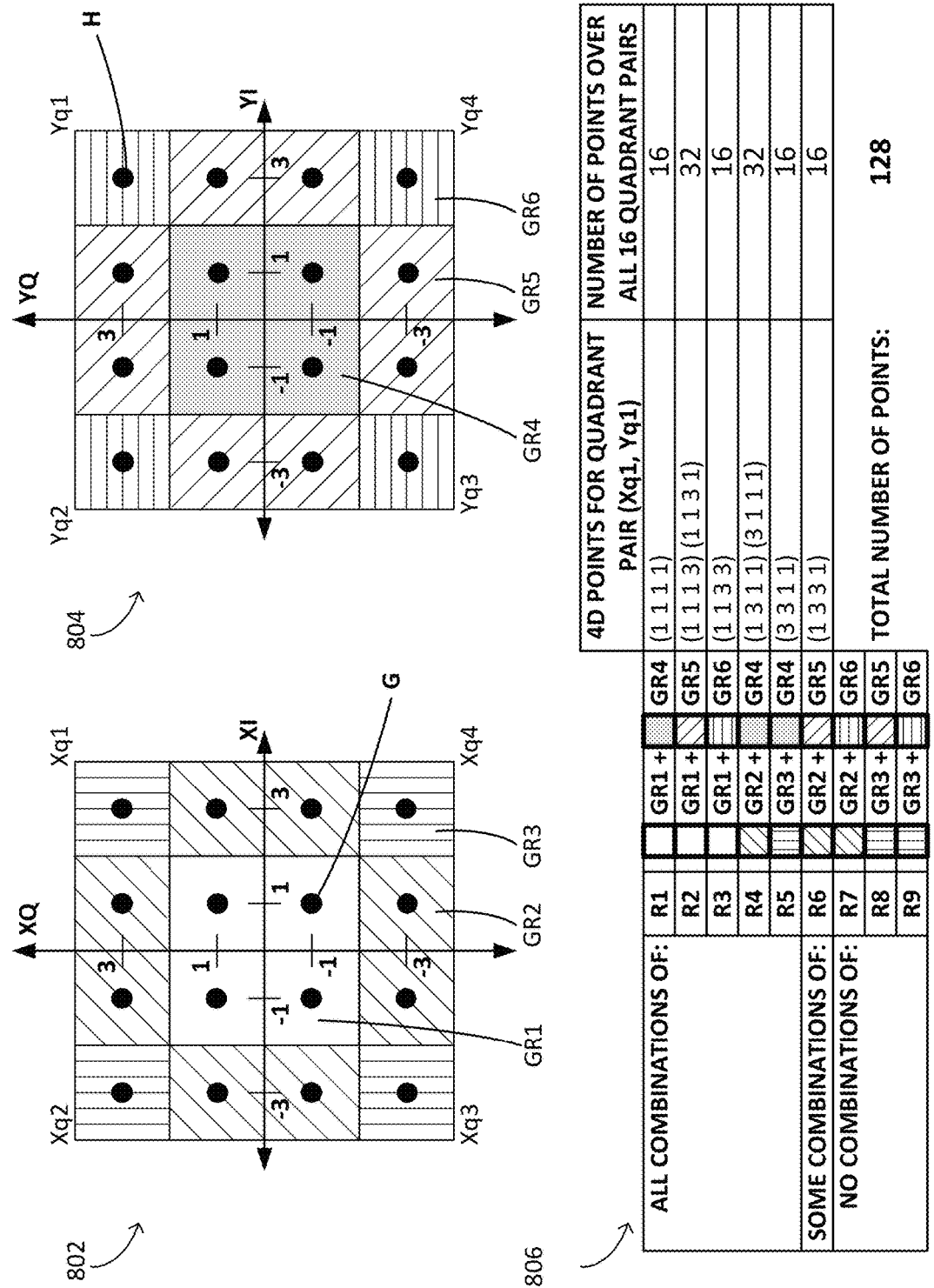
FIG. 8 illustrates a schematic showing a third example modulation format in accordance with some examples of the technology disclosed herein.

FIG. 8 illustrates a schematic showing a third example modulation format in accordance with some examples of the proposed technology. The third example modulation format conveys bits over two polarizations, X and Y, and may therefore be represented by a 4D constellation wherein each constellation point is defined by four projections corresponding to dimensions XI, XQ, YI, and YQ, respectively. The dimensions XI and XQ are illustrated in plot 802, while the dimensions YI and YQ are illustrated in plot 804. Plot 802 comprises four quadrants denoted Xq1, Xq2, Xq3, and Xq4, respectively (i.e., the X quadrants). Plot 804 comprises four quadrants denoted Yq1, Yq2, Yq3, and Yq4, respectively (i.e., the Y quadrants). In this example, the 4D constellation is defined in the dimensions XI, XQ, YI, and YQ. However, in other examples, the four dimensions may be mapped to different axes, for example, in the time-domain and/or frequency-domain. For example, FDM techniques may be used. In general, the modulation format may be spread over any combination of time, frequency, and polarization.

The third example modulation format is designed to achieve a spectral efficiency of 7 bits per baud over four dimensions, which is equivalent to 3.5 bits per baud per polarization, or 1.75 bits per baud per dimension. The number of 4D constellation points required to achieve this spectral efficiency is $2^7=128$. These 128 constellation points form a subset of points selected from a set of 256 points generated from a Cartesian product of two 16QAM constellations (in this case, DP-16QAM), where the subset is defined according to a set of rules, such as the rules provided in table 806. The rules dictate which combinations of magnitudes in the XI, XQ, YI, and YQ dimensions are permitted. In this example, the rules dictate that points forming the subset are the 128 points of the 256-point set having the lowest energies.

In the example of FIG. 8, there are four possible projections (−3, −1, 1, 3) in each dimension. The projections include two possible magnitudes (1, 3) and two possible signs (+, −). The rules for determining which 4D points of the 256-point set are selected to form the 128-point subset may be expressed by dividing the points of each 2D constellation into groups. For example, as illustrated in FIG. 8, the 2D points of the constellation in plot 802 are divided or categorized or partitioned into first points (belonging to group GR1), second points (belonging to group GR2), and third points (belonging to group GR3), while the 2D points of the constellation in plot 804 are divided or categorized or partitioned into fourth points (belonging to group GR4), fifth points (belonging to group GR5), and sixth points (belonging to group GR6). In this example, each one of groups GR1 and GR4 consists of the 2D points for which each projection has a magnitude of 1. Each one of groups GR2 and GR5 consists of the 2D points for one projection has a magnitude of 1, and the other projection has a magnitude of 3. Each one of groups GR3 and GR6 consists of the 2D points for which each projection has a magnitude of 3. The group definitions in FIG. 8 are merely examples, and other groupings are contemplated.

Rows R1, R2, and R3 of table 806 stipulate that the 128-point subset includes any 4D point that is generated by combining any point in group GR1 with any point in any one of groups GR4, GR5, and GR6 (i.e., any point in plot 804). Rows R4 and R5 of table 806 stipulate that the 128-point subset further includes any 4D point that is generated by combining any point in any one of groups GR2 and GR3 with any point in group GR4. Thus, referring to the quadrant pair (Xq1, Yq1) alone, rows R1-R5 of table 806 define 7 4D points that are included in the subset. Since there are 16 possible pairs of X quadrants and Y quadrants, this results in 7×16=112 unique 4D points being included in the subset as a result of these rules.

Row R6 of table 806 stipulates that the 128-point subset includes some 4D points that are generated by combining points from group GR2 with points from group GR5. In this example, the specific combinations of points from group GR2 and points from group GR5 result in 1×16=16 additional 4D points being included in the subset.

Rows R7, R8, and R9 of table 806 stipulate that the 128-point subset excludes any 4D point that is generated by combining any point in group GR3 with any point in group GR5 or group GR6, and also excludes any 4D point that is generated by combining any point in group GR2 with any point in group GR6.

According to row R1 in table 806, all combinations of magnitude 1 are permitted. Thus, a corresponding rule may be defined wherein all of the DP-16QAM constellation points having dimensions with projections selected from (−1, 1) are permitted. Referring to the quadrant pair (Xq1, Yq1) alone, there is only one point satisfying this rule: (1, 1, 1, 1). Over all 16 quadrant pairs, there are 16×1=16 unique 4D points satisfying this rule. Notably, this rule results in selection of the 16 lowest-energy points of the DP-16QAM format with energy value 1+1+1+1=4.

Rows R2 and R4 stipulate that permitted combinations of magnitudes include those consisting of three instances of magnitude 1 and one instance of magnitude 3. Thus, a corresponding rule may be defined wherein all of the DP-16QAM points having three dimensions with a projection selected from (−1, 1) and one dimension with a projection selected from (−3, 3) are permitted. Referring again to the quadrant pair (Xq1, Yq1), there are four possible combinations corresponding to the four unique constellation points listed in table 806. Over all 16 quadrant pairs, there are 16×4=64 unique 4D points satisfying this rule. Notably, this rule results in selection of the next 64 points within the DP-16QAM format with the lowest energy level value $1+1+1+3^2=12$.

Rows R3, R5, and R6 stipulate that one half of the 4D points having magnitudes consisting of two instances of magnitude 1 and two instances of magnitude 3 are permitted. Thus, a corresponding rule may be defined wherein half of the DP-16QAM points having two dimensions with a projection selected from (−1, 1) and two dimensions with a projection selected from (−3, 3) are permitted. Referring again to the quadrant pair (Xq1, Yq1), there are six possible points satisfying the projection value requirements of this rule. Half of these points are arbitrarily selected. In this particular example, rows R3, R5, and R6 dictate that the selected points are (1 1 3 3), (3 3 1 1), and (1 3 3 1), while row R6 further dictates that the excluded points are (3 1 1 3), (3 1 3 1), and (1 3 1 3). Over all 16 quadrant pairs, there are 16×3=48 unique 4D points satisfying this rule. These points form the next lowest energy level with energy value $3^2+3^2+1+1=20$.

Using the rules for the permitted combinations of magnitudes, as expressed in table 806, a total of 128 4D constellation points are selected from the 256 constellation points of the DP-16QAM format. The constellation formed by the selected 128-point subset is representative of a modulation format which may herein be referred to as 4D-128QAM, since the modulation format consists of 128 levels defined using QAM. The points of the DP-16QAM constellation that do not satisfy the rules are excluded from 4D-128QAM constellation.

In this example, the 16 points having the lowest energies (all combinations of magnitude 1) are equivalent to the points of a DP-QPSK constellation. The remaining 112 points of the 4D-128QAM constellation are the next lowest-energy points, for which only some combinations of magnitudes are permitted. For ease of explanation, the constellation points of the 4D-128QAM constellation that do not belong to the DP-QPSK constellation may be described as belonging to the complement of DP-QPSK. Notably, the signs of the projections on each dimension play no role on the selection of the 128 constellation points.

Each 4D constellation point of the 4D-128QAM constellation is representative of a unique sequence of seven bits. Four bits of the seven bits determine the four respective signs of the projections to which the seven bits are mapped. The remaining three bits determine the four magnitudes of the projections to which the seven bits are mapped. For example, according to one possible bit-to-symbol mapping, a bit sequence (b1, b2, b3, b4, b5, b6, b7)=(1, 1, 1, 0, 1, 0, 0) may be mapped to the constellation point (G, H), which is defined by the set of projections (1, −1, 3, 3). The bits (b1, b2, b3)=(1, 1, 1) may determine the four magnitudes (1, 1, 3, 3) defining the constellation point (i.e., the position of the point within a quadrant pair), while the bits (b5, b6, b7)=(0, 1, 0, 0) may determine the four respective signs (+, +, +) defining the constellation point (i.e., the quadrant pair).

As described with respect to the 4D-512QAM format, the constellation points of the 4D-128QAM format may be defined by projections on a 4D rectangular lattice. Alternatively, the positions of the points may be optimized for minimization of BER, such that at least some of the points are offset from the rectangular lattice.

Figure 9:
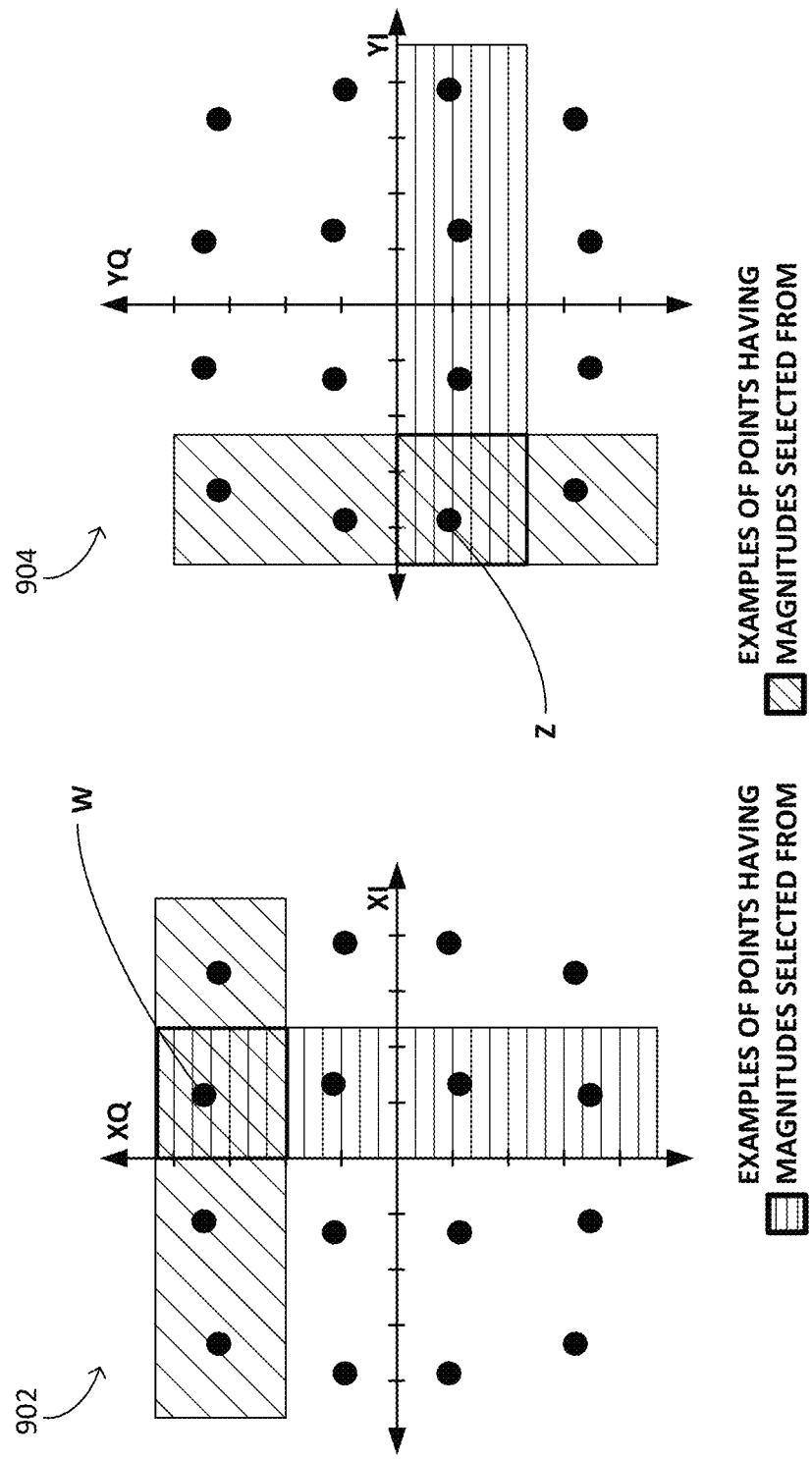
FIG. 9 illustrates a schematic showing a fourth example modulation format in accordance with some examples of the technology disclosed herein.

FIG. 9 illustrates a schematic showing a fourth example modulation format in accordance with some examples of the proposed technology. The dimensions XI and XQ are illustrated in plot 902, while the dimensions YI and YQ are illustrated in plot 904.

The fourth example modulation format is similar to the third modulation format described with respect to FIG. 8, except that the projections of the constellation points have been optimized for minimization of BER. As a result, instead of each constellation point being defined by four magnitudes selected from two possible values (e.g., 1 and 3, as described with respect to FIG. 8), each constellation point is defined by four magnitudes selected from two possible sets of values. For example, the combinations of magnitudes may be selected from a set of first values and a set of second values, wherein each second value is greater than each first value. In the limit where a set of values has a variance of zero, all of the values within that set are identical. For example, the third example modulation format described with respect to FIG. 8 corresponds to the case where the first set of values includes magnitude 1 and the second set of values includes magnitude 3, and where the variance of each set of values is zero. In contrast, the constellation points of the fourth example modulation format shown in FIG. 9 are defined by magnitudes selected from two sets of values with non-zero variance. For example, the horizontally-hatched region of plot 902 includes four 2D points having magnitudes in dimension XI that belong to a set of first values. As a result of optimization, the magnitudes are not identical, such that the variance of the set of first values is non-zero. The horizontally-hatched region in plot 904 also includes four 2D points having magnitudes in dimension YQ that belong to the set of first values. Again, these magnitudes are not identical as a result of optimization. The eight points in the horizontally-hatched regions in plots 902 and 904 represent merely some examples of the points having magnitudes that belong to the set of first values.

The diagonally-hatched region in plot 902 includes four 2D points having magnitudes in dimension XQ that belong to a set of second values with a non-zero variance. These points are merely examples of the points having magnitudes that belong to the set of second values. The set of second values is distinguished from the set of first values in that each second value is greater than each first value.

The constellation for the fourth example modulation format may be determined using similar rules to those described with respect to FIG. 8. However, the rules may be defined with reference to permitted combinations of magnitudes selected from a set of first values (rather than strictly magnitude "1") and a set of second values (rather than strictly magnitude "3"). For example, FIG. 9 illustrates a 4D point (W, Z)=(aXI, aXQ, aYI, aYQ), where aXI is the XI projection, where aXQ is the XQ projection, where aYI is the YI projection, and where aYQ is the YQ projection. The magnitude |aXI| has a value that is selected from the set of first values; the magnitude |aXQ| has a value that is selected from the set of second values; the magnitude |aYI| has a value that is selected from the set of second values; and the magnitude |aYQ| has a value that is selected from the set of first values. Thus, the constellation point (W, Z) represents four magnitudes consisting of two values selected from the set of first values and two values selected from the set of second values. In this case, the specific combination of magnitudes is analogous to the combination (1 3 3 1) in table 806. Thus, if the rules expressed in table 806 were defined more generally with reference to permitted combinations of magnitudes selected from a set of first values and a set of second values, then the constellation point (W, Z) would indeed belong to the 4D-128QAM constellation.

The proposed 4D-512QAM and 4D-128QAM formats described with reference to FIGS. 6, 7, 8, and 9 are examples of 4D modulation formats that are formed by selecting a subset of the $2^N$ lowest energy points of the Cartesian product of two 2D modulation formats, where N denotes the number of FEC-encoded bits which uniquely determines the 4D constellation point. In general, it is contemplated the techniques described herein may be used to generate other modulation formats that achieve fractional spectral efficiencies. For example, a 4D-2048QAM format may be generated by selecting the 2048 lowest energy points of the cartesian product of a DP-256QAM format (thereby achieving a spectral efficiency of 11 bits in 4D). Similarly, a 4D-32QAM format may be generated by selecting the 32 lowest energy points of a DP-8QAM format (thereby achieving a spectral efficiency of 5 bits in 4D).

Figure 10:
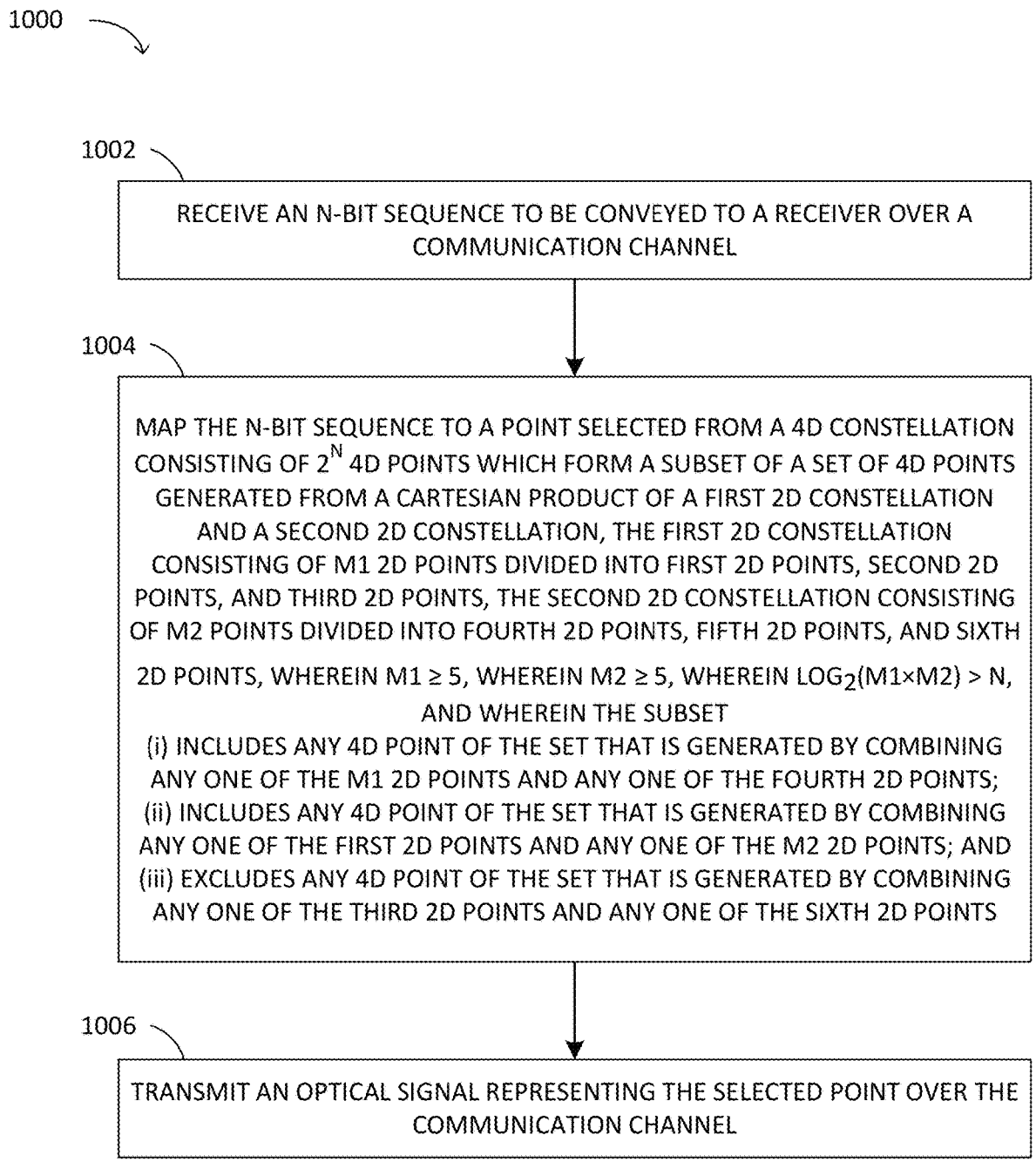
FIG. 10 illustrates an example method for transmitting an optical signal in accordance with some examples of the technology disclosed herein.

FIG. 10 illustrates an example method 1000 for transmitting an optical signal in accordance with some examples of the technology disclosed herein. The method 1000 may be used, for example, to encode bits according to the first example modulation format of FIG. 6, the second example modulation format of FIG. 7, the third example modulation format of FIG. 8, or the fourth example modulation format of FIG. 9. The method 1000 may alternatively be used to encode bits according to other modulation formats to achieve fractional spectral efficiencies. The method 1000 may be performed at a transmitter device, such as the transmitter device 102 or 200.

At 1002, the transmitter device receives an N-bit sequence to be conveyed to a receiver, such as the receiver device 104 or 300, over a communication channel, such as the communication channel 106. For example, as described with respect to FIG. 2, the ASIC 222 of the transmitter device 200 may receive a sequence of N bits as part of the FEC-encoded bits 248 that are generated as a result of applying the FEC encoding 250 to the client bits 202. According to some examples, the FEC-encoded bits 248 may comprise a plurality of N-bit sequences, and the method 1400 may be applied to each N-bit sequence. According to the first and second example modulation formats described with respect to FIGS. 6 and 7 (i.e., 4D-512QAM), N=9. According to the third and fourth example modulation formats described with respect to FIGS. 8 and 9 (i.e., 4lD-128QAM), N=7. Other values of N are possible.

At 1004, the transmitter device maps the N-bit sequence received at 1002 to a point selected from a 4D constellation consisting of $2^N$ 4D points, where each point represents four projections corresponding to four respective dimensions. According to some examples, the four respective dimensions consist of XI, XQ, YI, and YQ. In other examples, the mapping may involve multiple time slots and/or multiple FDM dimensions. According to some examples, the 4D constellation projection may be symmetric over some or all of the dimensions. As an example, being symmetric over a second dimension means that if the 4D point (c1, c2, c3, c4) belongs to the constellation set, the 4D points (c1, −c2, c3, c4) also belongs to the constellation set.

The mapping may be achieved, for example, using the bit-to-symbol mapping 246 implemented by the ASIC 222. The $2^N$ 4D points form a subset of a set of 4D points generated from a Cartesian product of a first 2D constellation and a second 2D constellation. The first 2D constellation consists of M1 2D points divided or categorized or partitioned into first 2D points, second 2D points, and third 2D points. The second 2D constellation consists of M2 2D points divided or categorized or partitioned into fourth 2D points, fifth 2D points, and sixth 2D points. In general M1>5, M2>5, and log 2(M1×M2)>N. According to some examples, M1=$2^J$ and M2=$2^K$, where J and K are positive integers, such that $\log_2$(M1) is a positive integer, and $\log_2$(M2) is also a positive integer. According to some examples, J=K, such that $\log_2$(M1)=$\log_2$(M2) and M1=M2. According to some examples, the first 2D constellation is identical to the second 2D constellation. According to other examples, the first 2D constellation may have different dimensions than the second 2D constellation. According to some examples, the first 2D constellation may comprise a rectangular QAM format and the second 2D constellation may comprise another rectangular QAM format. The QAM formats may comprise, for example, any one or more of 8QAM, 9QAM, 16QAM, 32QAM, 36QAM, 64QAM, 128QAM or 256QAM.

As described with respect to the 4D-512QAM and 4D-128QAM examples, rules are used to establish which 4D points of the Cartesian product are included in the $2^N$-point subset. According to some examples, the subset includes any 4D point that is generated by combining any one of the M1

2D points (i.e., the union of the first 2D points, second 2D points, and third 2D points) with any one of the fourth 2D points. According to some examples, the subset also includes any 4D point that is generated by combining any one of the first 2D points with any one of the M2 2D points (i.e., the union of the fourth 2D points, fifth 2D points, and sixth 2D points). According to some examples, the subset does not include any 4D point that is generated by combining any one of the third 2D points with any one of the sixth 2D points.

According to some examples, the 4D points selected to form the subset may be constrained to a rectangular lattice, as described with respect to FIGS. 6 and 8. According to other examples, the coordinates of the 4D points may optimized for minimization of BER, such that the lattice is non-rectangular, as described with respect to FIGS. 7 and 9.

According to the example 4D-512QAM formats described with respect to FIGS. 6 and 7, the first and second 2D constellations used at step 1004 are 32QAM constellations (J=K=5, such that M1=M2=$2^5$=32, which satisfies the condition log 2(M1×M2)>N, for N=9), and the resulting 4D constellation consists of $2^9$=512 points which form a subset of the 1024 points generated from a Cartesian product of two 32QAM constellations. Referring to FIG. 6, for example, the subset includes any 4D point of the set that is generated by combining any one of the 2D points in plot 602 (groups GR1, GR2, and GR3) with any one of the 2D points in group GR4 of plot 604. The subset also includes any point of the set that is generated by combining any one of the 2D points in group GR1 of plot 602 with any one of the 2D points in plot 604 (groups GR4, GR5, and GR6). The subset excludes any 4D point of the set that is generated by combining any one of the 2D points in group GR3 of plot 602 with any one of the 2D points in group GR6 of plot 604. In this example, the 512 points of the subset are the lowest-energy points of the 1024-point set. However, other examples are contemplated wherein the groups are defined such that the 512 points of the subset are not necessarily the lowest-energy points.

According to the example 4D-128QAM formats described with respect to FIGS. 8 and 9, the first and second 2D constellations used at step 1004 are 16QAM constellations (J=K=4, such that M1=M2=$2^4$=16, which satisfies the condition log 2(M1×M2)>N, for N=7), and the resulting 4D constellation consists of $2^7$=128 points which form a subset of the 512 points generated from a Cartesian product of two 16QAM constellations. Referring to FIG. 8, for example, the subset includes any 4D point of the set that is generated by combining any one of the 2D points in plot 802 (groups GR1, GR2, and GR3) with any one of the 2D points in group GR4 of plot 804. The subset also includes any point of the set that is generated by combining any one of the 2D points in group GR1 of plot 802 with any one of the 2D points in plot 804 (groups GR4, GR5, and GR6). The subset excludes any 4D point of the set that is generated by combining any one of the 2D points in group GR3 of plot 802 with any one of the 2D points in group GR6 of plot 804. In this example, the 128 points of the subset are the lowest-energy points of the 512-point set. However, other examples are contemplated wherein the groups are defined such that the 128 points of the subset are not necessarily the lowest-energy points.

According to some examples, the subset may further include one or more of the 4D points of the set that are generated by combining any one of the second 2D points with any one of the fifth 2D points. For example, the groups defined in FIG. 6 result in the 4D-512QAM constellation including any 4D point generated by combining any 2D point from group GR2 and any 2D point from group GR5. On the other hand, the groups defined in FIG. 8 result in the 4D-128QAM constellation including only some of the 4D points generated by combining any 2D point from GR2 and any 2D point from group GR5.

According to some examples, the subset may further exclude one or more of the 4D points of the set that are generated by combining any one of the second 2D points with any one of the sixth 2D points, and the subset may further exclude one or more the 4D points of the set that are generated by combining any one of the third 2D points with any one of the fifth 2D points. For example, the groups defined in FIG. 6 result in the 4D-512QAM constellation excluding some 4D points generated by combining a 2D point from group GR2 with a 2D point from group GR6, and also excluding some 4D points generated by combining a 2D point from group GR3 with a 2D point from group GR5. On the other hand, the groups defined in FIG. 8 result in the 4D-128QAM constellation excluding all of the 4D points generated by combining a 2D point from group GR2 with a 2D point from group GR6, and also excluding all of the 4D points generated by combining a 2D point from group GR3 with a 2D point from group GR5.

According to some examples, the mapping at 1004 comprises the transmitter device uniquely determining the four signs of the selected 4D point using four bits of the N-bit sequence, and uniquely determining the four magnitudes of the selected 4D point using the remaining N−4 bits of the N-bit sequence. For example, in the case of 4D-512QAM, four bits of the 9-bit sequence are used to determine the four signs of the selected 4D point, while the remaining five bits of the 9-bit sequence are used to determine four magnitudes of the selected 4D point. In the case of 4D-128QAM, four bits of the 7-bit sequence are used to determine the four signs of the selected 4D point, while the remaining three bits of the 7-bit sequence are used to determine four magnitudes of the selected 4D point.

At 1006, the transmitter device transmits an optical signal over the communication channel, where the optical signal represents the selected constellation point to which the N-bit sequence was mapped at 1004. For example, the signal may comprise the DP optical signal 204, which has been generated as described with respect to FIG. 2, with the projections being determined by the drive signals 220 driving the E/O modulators 218. In another example, the transmitter may transmit a single-polarization optical signal. In yet another example, the four dimensions might map to different time-slots and/or different frequency dimensions of a FDM transmission scheme.

In the case where the constellation points are constrained to a 4D rectangular lattice, for example, as illustrated in FIG. 6, soft decoding complexity may be significantly reduced relative to 4D maximum likelihood decoding between 512 points. This reduced complexity is achievable because the projections are constrained to six possible values. In the example of FIG. 6, the six values are (±1, ±3, ±5), but alternative sets of six values are possible. As will be described in detail with respect to FIGS. 11 and 12, decoding an optical signal transmitted using a 4D-512QAM format (with rectangular lattice) may be achieved without having to perform a multi-dimensional search between the 512 constellation points and without the need for multiplication and squaring operations. A similar decoding strategy may be developed for 4D-128QAM with a rectangular lattice, for example.

Figure 11:
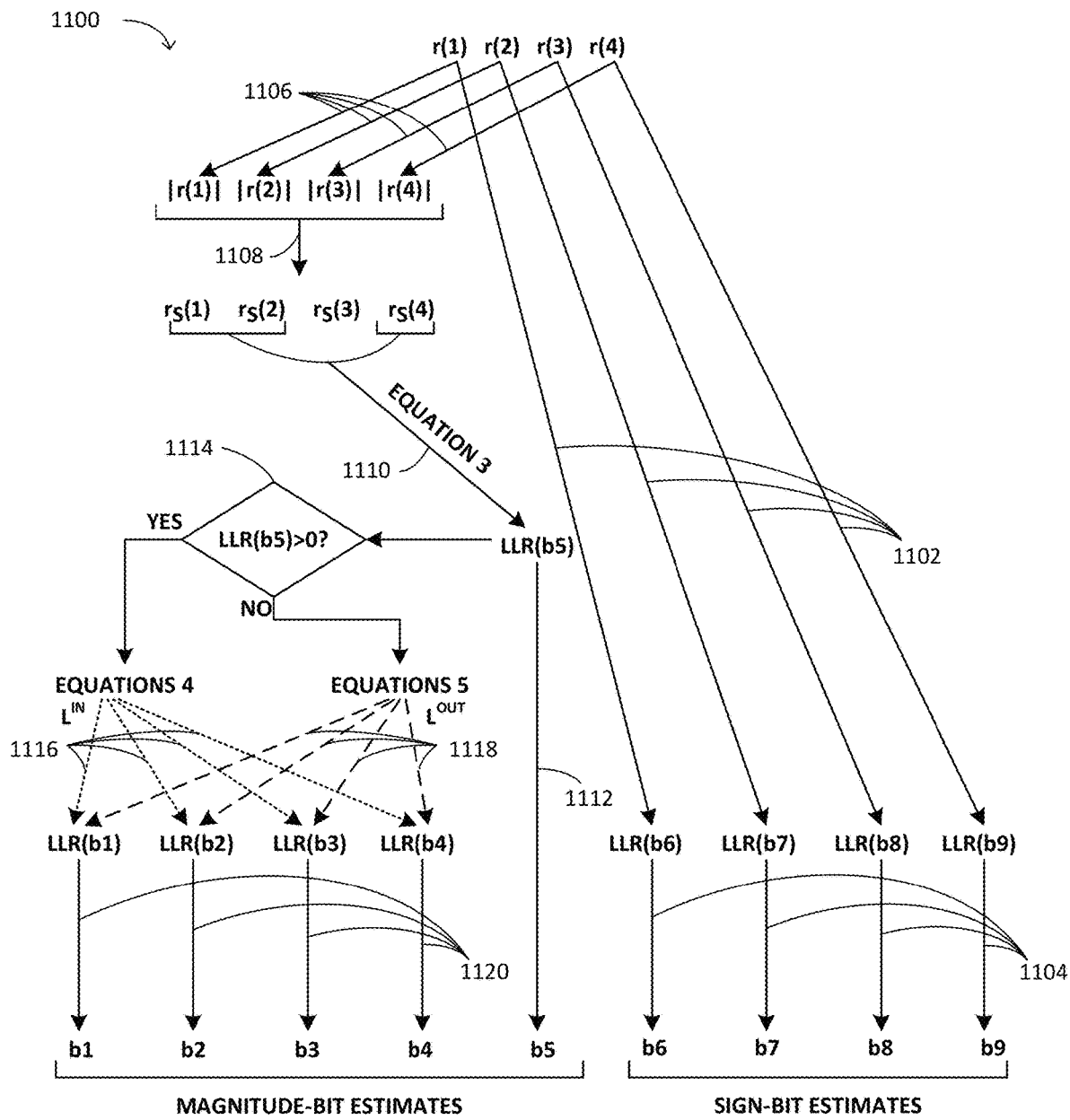
FIG. 11 illustrates a schematic showing an example decoding technique in accordance with some examples of the technology disclosed herein.

FIG. 11 illustrates a schematic 1100 showing an example decoding technique in accordance with some examples of the technology disclosed herein. The example decoding technique may be used for decoding bit estimates from an optical signal transmitted using the 4D-512QAM format illustrated in FIG. 6, for example, and with the four projections being constrained to six possible values. In the schematic 1100, the values are selected from (±1, ±3, ±5). However, other projection values may be used provided that they are constrained to six possible values and comply with rules for permitted combinations, such as the rules provided in table 606.

Beginning at the top of the schematic 1100, the receiver detects four projections corresponding to the four respective dimensions of the received optical signal, where the four projections are represented by a vector r=[r(1) r(2) r(3) r(4)]. According to one example, r(1), r(2), r(3), and r(4) denote the projections detected in dimensions XI, XQ, YI, and YQ, respectively. Generally speaking, as a result of noise and distortion in the communication channel, the four projections in the vector r are degraded versions of the projections selected at the transmitter to convey a unique sequence of nine bits, in accordance with the mapping performed at 1004. In other words, the vector r represents an estimate of a constellation point selected from the 4D-512QAM format described with respect to FIG. 6, and this estimate is used to decode a sequence of nine bit estimates.

The sequence of bit estimates decoded from the vector r is denoted [b1 b2 b3 b4 b5 b6 b7 b8 b9], where each bit estimate bi, i=1 . . . 9, may have a respective confidence value. In the following example, each bit estimate is represented by a log likelihood ratio (LLR), where the sign of the LLR value indicates whether the value of the bit estimate is 0 or 1 (positive sign indicates a value of 1; negative sign indicates a value of 0), and where the magnitude of the LLR value indicates the confidence in that bit estimate. In other examples, soft-decoded bit estimates may be represented by metrics other than LLR values. In examples in which hard decision FEC decoding is used, there is no soft information accompanying the decoded bit values.

As described previously, the transmitter device uses four bits of the 9-bit sequence to determine the four signs of the selected constellation point, and uses the remaining five bits of the 9-bit sequence to determine the four magnitudes of the selected constellation point. Accordingly, for ease of explanation, the sequence of nine bit estimates decoded from the received vector r may be described as consisting of four "sign-bit" estimates and five "magnitude-bit" estimates. In the following example, the five magnitude-bit estimates are denoted by b1, b2, b3, b4, and b5, and the four sign-bit estimates are denoted by b6, b7, b8, and b9.

As denoted by arrows 1102, the LLR values for the four sign-bit estimates may be calculated directly from the respective values of r(1), r(2), r(3), and r(4) according to Equations 1:

$$LLR(b6)=r(1)$$

$$LLR(b7)=r(2)$$

$$LLR(b8)=r(3)$$

$$LLR(b9)=r(4) \quad [1]$$

where LLR(bi) denotes the log likelihood ratio of bit estimate bi. As denoted by arrows 1104, the values of the bit estimates b6, b7, b8, and b9 are determined from the signs of the respective LLR values. The confidence values (not shown) are determined from the respective magnitudes of the LLR values. In general, LLR values might be calculated as a scaled version of what is presented in Equation [1].

The magnitudes |r(1)|, |r(2)|, |r(3)|, and |r(4)|, are determined from the respective projections r(1), r(2), r(3), and r(4), as denoted by arrows 1106, and may be used to calculate the five magnitude-bit estimates according to Equations 2, 3, 4, and 5, as will now be described.

As denoted by arrow 1108, the magnitudes are sorted in ascending order according to Equation 2:

$$[r_S, r_{ID}] := \mathrm{sort}(|r(1)|,|r(2)|,|r(3)|,|r(4)|) \quad [2]$$

where the function "sort( )" denotes a sorting function similar to that defined in MATLAB® software, and where $r_S$ denotes a vector consisting of the ascendingly sorted values of |r|, such that $r_S(1) \leq r_S(2) \leq r_S(3) \leq r_S(4)$, where $r_S(n)=|r(r_{ID}(n))|$, and where $r_{ID}$ denotes a vector consisting of the respective dimension indices of the ascendingly sorted values of H. For example, if r=[r(1) r(2) r(3) r(4)]=[−5 −1 3 1] (corresponding, for example, to point (A, B) in FIG. 6), then |r|=[|r(4)| |r(2)| |r(3)| |r(4)|]=[5 1 3 1]; $r_S$=[$r_S(1)$ $r_S(2)$ $r_S(3)$ $r_S(4)$]=[1 1 3 5]; and $r_{ID}$=[2 4 3 1].

As denoted by arrow 1110, the LLR of a particular one of the five magnitude-bit estimates, denoted by b5 in this example, is determined according to Equation 3:

$$LLR(b5)=\max\{0,r_S(1)-2\}+\max\{0,r_S(2)-2\}+4-r_S(4) \quad [3]$$

where max{x,y} denotes the maximum of two values x and y. Thus, the magnitude-bit estimate b5 is calculated as a function of the highest one of the four magnitudes ($r_S(4)$) and the two lowest of the four magnitudes ($r_S(1)$ and $r_S(2)$).

As denoted by arrow 1112, the value of the bit estimate b5 is determined from the sign of LLR(b5). The sign of LLR(b5) also reflects whether the coordinates of the vector r belong to the inner DP-16QAM subset of the 4D-512QAM constellation, or to its outer complement subset. The decoding of the remaining four magnitude-bit estimates, denoted b1, b2, b3, and b4, is conditioned on whether LLR(b5)>0 or LLR(b5)<0. In the event that LLR(b5)>0 (e.g., a determination of "yes" at 1114), then values $L^{IN}(bi)$ are calculated using Equations 4:

$$L^{IN}(bi)=|r(i)|-2, \text{for } i=1 \ldots 4. \quad [4]$$

where the superscript "IN" indicates that r belongs to the 'in'ner DP-16QAM subset of the 4D-512QAM constellation. The values of LLR(bi), for i=1 . . . 4, are then set to be equal to the respective values $L^{IN}(bi)$ calculated using Equations 4, as denoted by dotted arrows 1116.

In the event that LLR(b5)<0 (e.g., a determination of "no" at 1114), then values $L^{OUT}(bi)$, for i=1 . . . 4, are calculated using Equations 5:

$$L^{OUT}(b3)=\max\{|r(3)|,|r(4)|\}-\max\{|r(1)|,|r(2)|\}$$

$$L^{OUT}(b4)=\max\{|r(2)|,|r(4)|\}-\max\{|r(1)|,|r(3)|\}$$

If $r_S(3)>2$ $$L^{OUT}(b1)=(1-2 \cdot c1[1]) \cdot \min\{f(r_S(3)-2,c1[1] \oplus c2[1]),f(r_S(4)-r_S(3),c1[1] \oplus c3[1]),f(r_S(3)-r_S(2),c1[1] \oplus c4[1])\}$$

$$L^{OUT}(b2)=(1-2 \cdot c1[2]) \cdot \min\{f(r_S(3)-2,c1[2] \oplus c2[2]),f(r_S(4)-r_S(3),c1[2] \oplus c3[2]),f(r_S(3)-r_S(2),c1[2] \oplus c4[2])\},$$

else $$L^{OUT}(b1)=(1-2 \cdot c2[1]) \cdot \min\{f(2-r_S(3),c1[1] \oplus c2[1]),f(2-r_S(2),$$

$c2[1] \oplus c4[1])\}$ $L^{OUT}(b2) = (1-2 \cdot c2[2]) \cdot \min\{f(2-r_S(3), c1[1] \oplus c2[2]), f(2-r_S(2), c2[2] \oplus c4[2])\}$, [5]

where the superscript "OUT" indicates that r belongs to the 'out'er DP-16QAM complement subset of the 4D-512QAM constellation, where $\max\{x,y\}$ denotes the maximum of two values x and y, where $\min\{x,y\}$ denotes the minimum of two values x and y, where $f(x,d)$ denotes a function defined in Equation 6, where $\oplus$ denotes an exclusive OR operation, and where c1[i], c2[i], c3[i], and c4[i], for i=1 . . . 2, are defined in Equations 7. As is apparent from the condition "If $r_S(3) > 2$ . . . else . . . ", the values of $L^{OUT}(b1)$ and $L^{OUT}(b2)$ are calculated differently depending on whether or not $r_S(3) > 2$.

$$f(x,d) = \begin{cases} \infty & \text{if } d == 1 \\ x & \text{if } d == 0 \end{cases} \quad [6]$$

where $\infty$ denotes infinity or, in practice, a number greater than all other possible LLR values.

$c1 = T(r_{ID}(4), r_{ID}(3))$ $c2 = T(r_{ID}(4), \text{Null})$ $c3 = T(r_{ID}(3), r_{ID}(4))$ $c4 = T(r_{ID}(4), r_{ID}(2))$  [7]

where $T(j, k)$ denotes an entry at row j and column k of a look-up table (LUT) T. Each entry in Table T (excluding the entries marked "N/A", which are not applicable) consists of a 2-bit sequence. Accordingly, each of the values c1, c2, c3, and c4 also consists of two bits. For example, c1=c1[2] c1[1], where the index 1 denotes the rightmost bit of the respective entry in Table T and the index 2 denotes the leftmost bit).

TABLE T

| T(j, k) | k = 1 | k = 2 | k = 3 | k = 4 | k = NULL |
|---|---|---|---|---|---|
| j = 1 | N/A | 00 | 10 | 01 | 11 |
| j = 2 | 11 | N/A | 10 | 01 | 00 |
| j = 3 | 10 | 01 | N/A | 00 | 11 |
| j = 4 | 10 | 01 | 11 | N/A | 00 |

Once Equations 5 have been used to calculate the values $L^{OUT}(bi)$, for i=1 . . . 4, these values are then used to set the respective values LLR(bi), for i=1 . . . 4, as denoted by dashed arrows 918.

The signs of the values LLR(b1), LLR(b2), LLR(b3), and LLR(b4) (which have been calculated using either Equations 4 or Equations 5) are used to determine the values of the bit estimates b1, b2, b3, and b4, as denoted by arrows 1120. The confidence values for these bit estimates are determined, at least in part, from the respective magnitudes of the LLR values, but may be impacted by additional factors, as will now be described.

The calculation of LLR(bi), for i=1 . . . 4, is conditioned on whether or not the magnitude-bit estimate b5 indicates that r belongs to the inner DP-16QAM subset of the 4D-512QAM constellation, or to its outer complement subset. Accordingly, when the confidence in the bit estimate b5 is low, the confidence in one or more of the bit estimates b1, b2, b3, and b4 may be reduced under certain circumstances. For example, for each value $L^{IN}(bi)$ that is determined using Equations 4, a comparison may be made with the respective value $L^{OUT}(bi)$ determined using Equations 5. If the signs of these values differ from one another, and if the confidence in the bit estimate b5 is lower than the confidence in the bit estimate bi that was selected (based on the bit estimate b5), then the confidence in the bit estimate bi may be reduced according to Equation 8:

$|LLR(bi)| = \min\{|LLR(bi)|, |LLR(b5)|\}$, for i=1 . . . 4.  [8]

One may consider an example in which LLR(b5)=1, meaning that it is more probable that Equations 4 (for calculating $L^{IN}(bi)$) will generate accurate estimates for bits b1, b2, b3, and b4, and less probable that Equations 5 (for calculating $L^{OUT}(bi)$) will generate accurate estimates for bits b1, b2, b3, and b4. One might consider a scenario wherein $L^{IN}(b3)=2$ (according to Equations 4), but $L^{OUT}(b3)=-1$ (according to Equations 5). A comparison of these two values indicates that sign($L^{OUT}(b3)$) sign($L^{IN}(b3)$). The initial confidence in bit estimate b3 is $|LLR(b3)|= |L^{IN}(b3)|=2$. However, Equation 8 dictates that the ultimate confidence in b3 is reduced to $|LLR(b3)|=\min\{|L^{IN}(b3)|, |LLR(b5)|\}=\min(2,1)=1$. The sign of LLR(b3) has not changed, but the magnitude of LLR(b3) has decreased from 2 to 1, reflecting the reduced confidence in the estimate of b3. In general, the confidence value for any bit estimate bi, for i=1 . . . 4, may be decreased depending on whether the signs of the respective LLR values differ when calculated using Equations 4 relative to Equations 5, and also depending on the initial confidence in the bit estimate bi relative to the confidence in the bit estimate b5.

The proposed decoding technique will now be explained with reference to several specific examples. According to a first example, the decoding associated with the transmitted point (D, B) in FIG. 6 is considered. For simplicity, this example assumes zero noise over the communication channel, such that the received vector detected at the receiver is r=[−1 1 3 1], with the four projections being identical to those of the DP optical signal transmitted by the transmitter. According to Equations 1, the four sign-bit estimates are calculated as LLR(b6)=−1, LLR(b7)=1, LLR(b8)=3, and LLR(b9)=1. In this example, the magnitude vector is =[1 1 3 1]. According to Equation 2, the sorted magnitude vector is $r_S$=[1 1 1 3], and the sorted dimension vector is $r_{ID}$=[1 2 4 3]. Equation 3 is used to calculate one of the five magnitude-bit estimates as LLR(b5)=max(0,−1)+max(0,−1)+4−3=1. Since LLR(b5)=1>0, it follows that r belongs to the inner DP-16QAM subset of the 4D-512QAM constellation and that bits b1, b2, b3, and b4 may be decoded according to Equations 4. Since r=[−1 1 3 1], Equations 4 dictate that LLR(b1)=$L^{IN}$(b1)=−1, LLR(b2)=$L^{IN}$(b2)=−1, LLR(b3)=$L^{IN}$(b3)=1, and LLR(b4)=$L^{IN}$(b4)=−1. Thus, in addition to the four sign-bit estimates calculated using Equations 1, the five magnitude-bit estimates have been calculated using Equations 3 and 4. Accordingly, from the received vector r=[−1 1 3 1], the bit estimates [b1 b2 b3 b4 b5 b6 b7 b8 b9] are decoded as [0 0 1 0 1 0 1 1 1] having respective confidence values [1 1 1 1 1 1 1 3 1]. Notably, a true maximum likelihood decoding of 4D-512QAM would require calculating the Euclidean distance of the received point from all 512 possible constellation points. Such an operation would require 4×512=2048 squaring operations, where the factor "4" is due to the four dimensions and the factor "512" is due to the 512 possible constellation points in 4D. A comparison of each value $L^{IN}$(bi), for i=1 . . . 4, to a respective value $L^{OUT}$(bi), for i=1 . . . 4, as calculated using Equations 5, indicates that there is no difference in the respective signs, so Equation 8 is not applicable.

In a second example, the decoding associated with the point (A, B) in FIG. 6 is considered. For simplicity, this example again assumes zero noise over the communication channel, such that the received vector detected at the receiver is r=[−5 −1 3 1], with the four projections being identical to those of the DP optical signal transmitted by the transmitter. According to Equations 1, the four sign-bit estimates are calculated as LLR(b6)=r(1)=−5, LLR(b7)=r(2)=−1, LLR(b8)=r(3)=3, and LLR(b9)=r(4)=1. In this example, the magnitude vector is |r|=[5 1 3 1]. According to Equation 2, the sorted magnitude vector is $r_S$=[1 1 3 5], and the sorted dimension vector is $r_{ID}$=[2 4 3 1]. Equation 3 is used to calculate one of the five magnitude-bit estimates as LLR(b5)=max(0,−1)+max(0,−1)+4−5=−1. Since LLR(b5)=−1<0, it follows r belongs to the outer DP-16QAM complement subset of the 4D-512QAM constellation and that bits b1, b2, b3, and b4 may be decoded according to Equations 5. Thus, LLR(b3)=$L^{OUT}$(b3)=max(3,1)−max(5,1)=3−5=−2, and LLR(b4)=$L^{OUT}$(b4)=max(1,1)−max(5,3)=1−5=−4. The "if" condition in Equations 5 is satisfied because $r_S$(3)=3>2, so $L^{out}$(b1) and $L^{OUT}$(b2) are calculated according to that condition. According to Equations 7 and Table T, c1=T(1,3)=10, c2=T(1,Null)=11, c3=T(3,1)=10, and c4=T(1,4)=01. Accordingly, c1[1]=0; c1[2]=1; c2[1]=1; c2[2]=1; c3[1]=0; c3[2]=1; c4[1]=1; and c4[2]=0. Thus, the "if" condition in Equations 5 dictates that LLR(b1)=$L^{out}$(b1)=(1−2·0)·min(f(3−2, 0⊕1), f(5−3, 0⊕0), f(3−1, 0⊕1))=min(f(1,1), f(2, 0), f(2, 1))=min(∞, 2, ∞)=2; and LLR(b2)=$L^{OUT}$(b2)=(1−2·1)·min(f(3−2, 1⊕1), f(5−3, 1⊕1), f(3−1, 1⊕0))=(−1)·min(f(1,0), f(2,0), f(2,1))=min(1, 2, ∞)=1. Thus, in addition to the four sign-bit estimates calculated using Equations 1, the five magnitude-bit estimates have been calculated, using Equations 3 and 5, as LLR(b1)=2, LLR(b2)=1, LLR(b3)=−2, LLR(b4)=−4, and LLR(b5)=−1. Accordingly, from the received vector r=[−5 −1 3 1], the bit estimates [b1 b2 b3 b4 b5 b6 b7 b8 b9] are decoded as [1 1 0 0 0 0 1 1] with initial respective confidence values [2 1 2 4 1 5 1 3 1]. A comparison of $L^{OUT}$(b1) to $L^{IN}$(b1) indicates that there is no difference in sign, so Equation 8 is not applicable. A comparison of $L^{OUT}$(b2) to $L^{IN}$(b2) indicates that there is a difference in sign. Accordingly, Equation 8 dictates that |LLR(b2)|=min{1, 1}=1. Thus, the ultimate confidence in bit estimate b2 remains the same as the initial confidence value 1. A comparison of $L^{OUT}$(b3) to $L^{IN}$(b3) indicates that there is a difference in sign. Accordingly, Equation 8 dictates that |LLR(b3)|=min{2, 1}=1. Thus, the ultimate confidence in bit estimate b3 has been reduced from 2 to 1. Finally, a comparison of $L^{OUT}$(b4) to $L^{IN}$(b4) indicates that there is no difference in sign, so Equation 8 is not applicable. It follows that the decoded bit sequence [1 1 0 0 0 0 1 1] has the ultimate confidence values [2 1 1 4 1 5 1 3 1].

For ease of explanation, Equations 1 through 8 and Table T apply to examples in which the projections of the four dimensions of the DP optical signal are selected from (±1, ±3, ±5). Similar equations and LUTs may be derived for decoding any DP optical signal where the projections in the four dimensions are constrained to six possible values.

Figure 12:
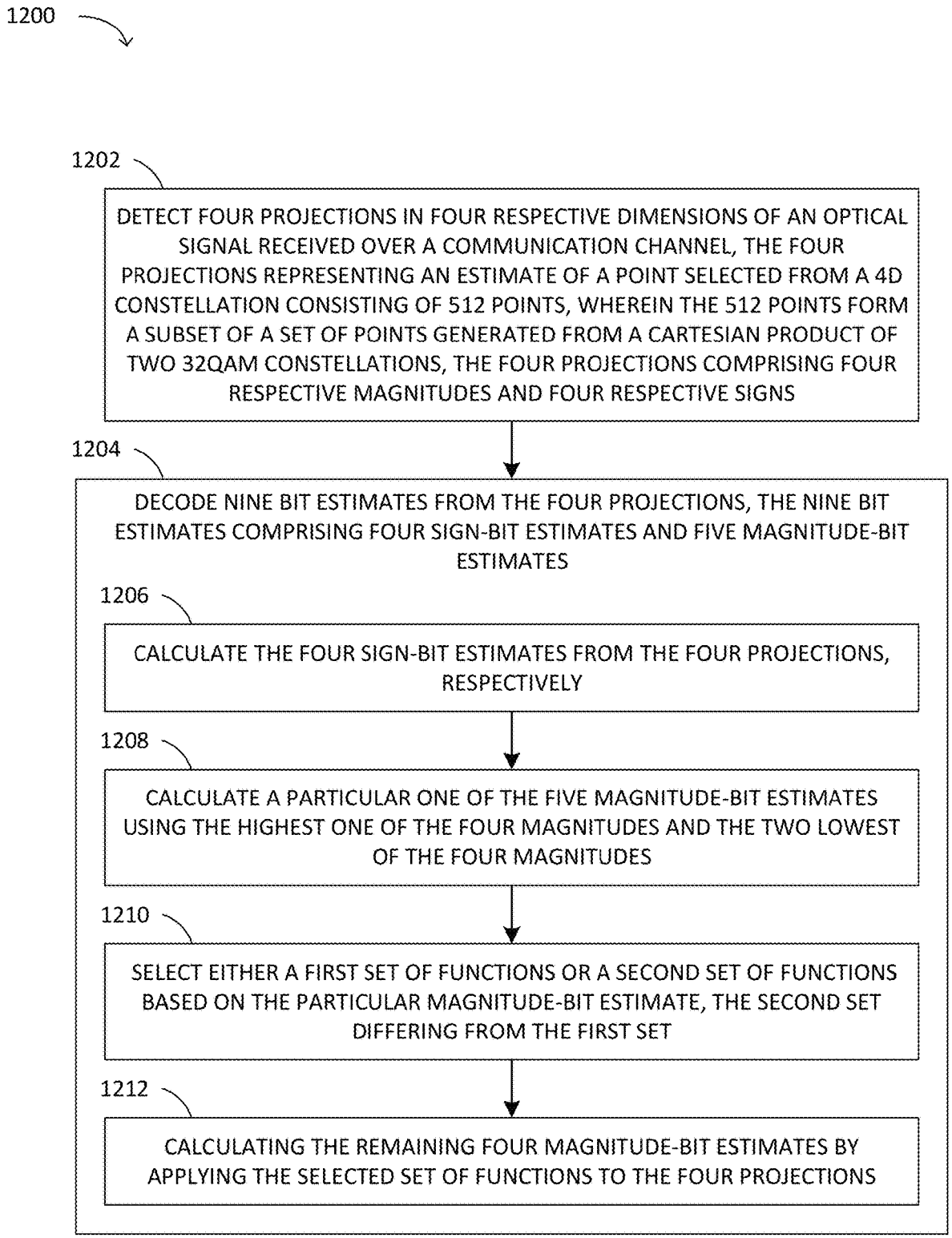
FIG. 12 illustrates an example method for decoding bit estimates from a received optical signal in accordance with some examples of the technology disclosed herein.

FIG. 12 illustrates an example method 1200 for decoding bit estimates from a received optical signal in accordance with some examples of the technology disclosed herein. The optical signal may be encoded with bits using, for example, the first example modulation format of FIG. 6, and may be transmitted according to the method 1000, for example. The method 1200 may be performed at a receiver device, such as the receiver device 104 or 300.

At 1202, the receiver device detects four projections in four respective dimensions of an optical signal received over a communication channel, the four projections representing an estimate of a point selected from a 4D constellation consisting of 512 points, wherein the 512 points form a subset of a set of points generated from a Cartesian product of two 32QAM constellations, the four projections comprising four respective magnitudes and four respective signs. For example, as described with respect to FIG. 3, the polarized components 308 are processed by the optical hybrid 310, thereby resulting in the optical signals 316 which are detected by the photodetectors 318. The photodetectors 318 convert the optical signals 316 into analog signals 320, and the ADCs 324 generate respective digital signals 326 from the analog signals 320. The digital signals 326 (and thus the four projections) are detected by processing components in the ASIC 322.

At 1204, the receiver device decodes nine bit estimates from the projections detected at 1202, where the nine bit estimates comprise four sign-bit estimates and five magnitude-bit estimates. The decoding at 1204 includes actions 1206-1212. As described with respect to FIG. 3, the decoding steps may be implemented as part of the symbol-to-bit demapping 328 performed by the ASIC 322.

At 1206, the receiver device calculates the four sign-bit estimates from the four projections, respectively. For example, as denoted by arrows 1102 and 1104 in FIG. 11, the LLRs for b6, b7, b8, and b9 are calculated directly from the projections r(1), r(2), r(3), and r(4) according to Equations 1. Thus, the value of each sign-bit estimate (0 or 1) is determined from the sign of the respective projection from which it was calculated, and the confidence in that value is determined from the magnitude of the respective projection from which it was calculated.

At 1208, the receiver device calculates a particular one of the five magnitude-bit estimates using the highest of the four magnitudes and the two lowest of the four magnitudes. For example, as denoted by arrows 1106, 1108, 1110, and 1112 in FIG. 11, the projections r(1), r(2), r(3), and r(4) are sorted in order of ascending magnitude according to Equation 2, thereby resulting in the sorted magnitudes $r_S$(1), $r_S$(2), $r_S$(3), $r_S$(4), and the LLR of the particular bit estimate b5 is calculated according to Equation 3, which depends on the highest magnitude, $r_S$(4), and the two lowest magnitudes, $r_S$(1) and $r_S$(2). The value of the particular magnitude-bit estimate (0 or 1) is determined from sign(LLR(b5)), and the confidence in that value is determined from |LLR(b5)|.

At 1210, the receiver device selects either a first set of functions or a second set of functions based on the sign of the particular magnitude-bit estimate calculated at 1208, where the second set differs from the first set. For example, as denoted at 1114 in FIG. 11, depending on whether the sign of LLR(b5) is positive or negative, either Equations 4 are selected, or Equations 5 are selected. Equations 4 comprise a different set of functions than Equations 5. In the case of Equations 4, each function in the set is identical (i.e., $L^{IN}$(bi)=r(i)−2, for i=1 . . . 4). In the case of Equations 5, each function is unique, and two of the functions are conditioned on the value of the second highest magnitude, $r_S$(3).

At 1212, the receiver device calculates the remaining four magnitude-bit estimates by applying to the four projections the set of functions selected at 1010. For example, as denoted at 1116 in FIG. 11, in the event that Equations 4 are selected, the LLRs for b1, b2, b3, and b4 are calculated by applying the set of functions for $L^{IN}$(bi) to the projections r(1), r(2), r(3), and r(4). Alternatively, as denoted at 1118, in the event that Equations 5 are selected, the LLRs for b1, b2, b3, and b4 are calculated by applying the set of functions for $L^{OUT}(bi)$ to the projections r(1), r(2), r(3), and r(4). As denoted at 1120, once the LLR for a given magnitude-bit estimate bi, has been calculated, the sign of LLR(bi) is used to determine whether the value of bi is 0 or 1.

The four magnitude-bit estimates calculated at 1212 may comprise respective confidence values. In some examples, the confidence for a given magnitude-bit estimate bi, for i=1 . . . 4, may be calculated from |LLR(bi)|. In other examples, the confidence for a given magnitude-bit estimate bi, for i=1 . . . 4, may be lower than |LLR(bi)|. For example, as described with respect to FIG. 11, in addition to calculating the four remaining magnitude-bit estimates using the set of functions selected at 1210, four alternative magnitude-bit estimates may be calculated using the other set of functions (i.e., the set of functions that was not selected at 1210). For example, if the first set of functions is selected at 1210 and then used to calculate the remaining four magnitude-bit estimates at 1212, the second set of functions may be used to calculate four alternative magnitude-bit estimates. A determination may be made as to whether any one of the four alternative magnitude-bit estimates comprises a different sign than a corresponding remaining magnitude-bit estimate. Another determination may be made as to whether the confidence in the particular magnitude-bit estimate calculated at 1208 is lower than the confidence in the corresponding remaining magnitude-bit estimate. Responsive to both of these determinations being true, the confidence in the corresponding remaining magnitude-bit estimate may be reduced. For example, as described with respect to FIG. 11, responsive to determining that (i) sign($L^{IN}$(bi)) sign($L^{OUT}$(bi)), and (ii) |LLR(b5)|<|LLR(bi)|, the confidence in the magnitude-bit estimate bi may be reduced from |LLR(bi)| to |LLR(b5)|, in accordance with Equation 8.

The 4D modulation formats proposed herein offer new solutions for achieving fractional spectral efficiencies, while avoiding implementation complexities associated with techniques such as probabilistic constellation shaping. For example, the proposed 4D-512QAM formats employ half of the points of the DP-32QAM format to achieve a fractional spectral efficiency 4.5 bits per baud per polarization, while the proposed 4D-128QAM formats employ half of the points of the DP-16QAM format to achieve a fractional spectral efficiency of 3.5 bits per baud per polarization. The strategy of achieving a fractional spectral efficiency by selecting a subset of the set of 4D points generated from a Cartesian product of two 2D constellations may be applied to other 2D base constellations. Furthermore, in the case where the 4D points are constrained to a rectangular lattice, a reduction in soft decoding complexity may be achieved.

The scope of the claims should not be limited by the details set forth in the examples, but should be given the broadest interpretation consistent with the description as a whole.

What is claimed is:

1. A transmitter device comprising:
   circuitry configured to receive an N-bit sequence to be conveyed from the transmitter device to a receiver device over a communication channel, wherein N is a positive whole number;
   circuitry configured to map the N-bit sequence to a point selected from a four-dimensional (4D) constellation consisting of $2^N$ 4D points which form a subset of a set of 4D points generated from a Cartesian product of a first two-dimensional (2D) constellation and a second 2D constellation, the first 2D constellation consisting of M1 2D points partitioned into first 2D points, second 2D points, and third 2D points, and the second 2D constellation consisting of M2 2D points partitioned into fourth 2D points, fifth 2D points, and sixth 2D points, wherein M1≥5, wherein M2≥5, and wherein $\log_2(M1 \times M2) > N$, and
   wherein the subset
   (i) includes any 4D point of the set that is generated by combining any one of the M1 2D points and any one of the fourth 2D points;
   (ii) includes any 4D point of the set that is generated by combining any one of the first 2D points and any one of M2 2D points; and
   (iii) excludes any 4D point of the set that is generated by combining any one of the third 2D points and any one of the sixth 2D points; and
   circuitry configured to transmit over the communication channel an optical signal representing the selected point.

2. The transmitter device as claimed in claim 1, wherein the subset consists of the $2^N$ 4D points of lowest energy in the set.

3. The transmitter device as claimed in claim 1, wherein $\log_2(M1)$ is a positive integer, and wherein $\log_2(M2)$ is a positive integer.

4. The transmitter device as claimed in claim 3, wherein M1=M2.

5. The transmitter device as claimed in claim 1, wherein the first 2D constellation is identical to the second 2D constellation.

6. The transmitter device as claimed in claim 1, wherein the first 2D constellation comprises a rectangular quadrature amplitude modulation (QAM) format and wherein the second 2D constellation comprises another rectangular QAM format.

7. The transmitter device as claimed in claim 6, wherein the QAM formats comprise any one or more of 8QAM, 9QAM, 16QAM, 32QAM, 36QAM, 64QAM, 128QAM, and 256QAM.

8. The transmitter device as claimed in claim 1, wherein N=9, wherein M1=32, and wherein M2=32.

9. The transmitter device as claimed in claim 1, wherein N=7, wherein M1=16, and wherein M2=16.

10. The transmitter device as claimed in claim 1, wherein the 4D constellation is symmetric over each dimension.

11. The transmitter device as claimed in claim 10, wherein each one of the $2^N$ 4D points represents four projections corresponding to four respective dimensions, and wherein each projection comprises a respective magnitude and a respective sign, the transmitter device further comprising circuitry configured
   to uniquely determine the four signs of the selected point using four bits of the N-bit sequence; and
   to uniquely determine the four magnitudes of the selected point using the remaining N−4 bits of the N-bit sequence.

12. The transmitter device as claimed in claim 1, wherein the optical signal comprises a dual-polarization optical signal, and wherein each one of the $2^N$ 4D points represents four projections corresponding to four respective dimensions consisting of an in-phase dimension for each polarization and a quadrature dimension for each polarization.

13. The transmitter device as claimed in claim 1, wherein the $2^N$ 4D points are distributed over a rectangular lattice.

14. The transmitter device as claimed in claim 1, wherein the subset further includes one or more of the 4D points of the set that are generated by combining any one of the second 2D points with any one of the fifth 2D points.

15. The transmitter device as claimed in claim 1, wherein the subset further excludes one or more of the 4D points of the set that are generated by combining any one of the second 2D points with any one of the sixth 2D points, and wherein the subset further excludes one or more the 4D points of the set that are generated by combining any one of the third 2D points with any one of the fifth 2D points.

16. A receiver device comprising:
    circuitry configured to detect four projections in four respective dimensions of an optical signal received over a communication channel, the four projections representing an estimate of a point selected from a four-dimensional (4D) constellation consisting of 512 points, wherein the 512 points form a subset of a set of points generated from a Cartesian product of two 32-quadrature amplitude modulation (32QAM) constellations, and the four projections comprising four respective magnitudes and four respective signs;
    circuitry configured to decode nine bit estimates from the four projections, the nine bit estimates comprising four sign-bit estimates and five magnitude-bit estimates, wherein the decoding comprises
        calculating the four sign-bit estimates from the four projections, respectively;
        calculating a particular one of the five magnitude-bit estimates using the highest one of the four magnitudes and the two lowest of the four magnitudes;
        based on the particular magnitude-bit estimate, selecting either a first set of functions or a second set of functions, the second set differing from the first set; and
        calculating the remaining four magnitude-bit estimates by applying the selected set of functions to the four projections.

17. The receiver device as claimed in claim 16, wherein the subset consists of
    256 points representing four magnitudes, each magnitude selected from a first value and a second value, the second value being greater than the first value;
    64 points representing four magnitudes consisting of three instances of the first value and one instance of a third value, the third value being greater than the second value; and
    192 points representing four magnitudes consisting of two instances of the first value, one instance of the second value, and one instance of the third value.

18. The receiver device as claimed in claim 17, wherein the particular magnitude-bit estimate represents whether or not the selected point belongs to the 256 points.

19. The receiver device as claimed in claim 16, wherein each sign-bit estimate and each magnitude-bit estimate comprises a respective confidence.

20. The receiver device as claimed in claim 19, wherein the decoding further comprises
    applying the other one of the first set of functions and the second set of functions to the four projections to calculate four alternative magnitude-bit estimates corresponding to the remaining magnitude-bit estimates; and
    responsive to determining that (i) any one of the four alternative magnitude-bit estimates comprises a different sign than a corresponding remaining magnitude-bit estimate, and (ii) the confidence in the particular magnitude-bit estimate is lower than the confidence in the corresponding remaining magnitude-bit estimate, reducing the confidence in the corresponding remaining magnitude-bit estimate.

* * * * *